(12) United States Patent
Holm et al.

(10) Patent No.: US 11,400,405 B2
(45) Date of Patent: Aug. 2, 2022

(54) FILTER ELEMENT WITH TAPERED PERIMETER

(71) Applicant: Cummins Filtration IP, Inc., Columbus, IN (US)

(72) Inventors: Christopher E. Holm, Madison, WI (US); Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 439 days.

(21) Appl. No.: 16/315,765

(22) PCT Filed: Jul. 11, 2017

(86) PCT No.: PCT/US2017/041549
§ 371 (c)(1),
(2) Date: Jan. 7, 2019

(87) PCT Pub. No.: WO2018/013577
PCT Pub. Date: Jan. 18, 2018

(65) Prior Publication Data
US 2020/0108342 A1  Apr. 9, 2020

Related U.S. Application Data

(60) Provisional application No. 62/361,922, filed on Jul. 13, 2016.

(51) Int. Cl.
*B01D 46/52* (2006.01)
*B01D 46/10* (2006.01)
*B01D 46/00* (2022.01)

(52) U.S. Cl.
CPC ........... *B01D 46/527* (2013.01); *B01D 46/10* (2013.01); *B01D 46/0001* (2013.01);
(Continued)

(58) Field of Classification Search
None
See application file for complete search history.

(56) References Cited

U.S. PATENT DOCUMENTS 3,921,432 A * 11/1975 Rivers .................. B01D 46/523
72/196
4,410,427 A  10/1983 Wydeven
(Continued)

FOREIGN PATENT DOCUMENTS

DE  10 2006 029 105  12/2006
EP      1 985 351 A1  10/2008
(Continued)

OTHER PUBLICATIONS

International Search Report and Written Opinion for International Application No. PCT/US2017/041549, dated Dec. 5, 2017, 12 pages.

*Primary Examiner* — Christopher P Jones
*Assistant Examiner* — Brit E. Anbacht
(74) *Attorney, Agent, or Firm* — Foley & Lardner LLP

(57) ABSTRACT

Various example embodiments relate to filter elements. One such filter element includes filter media having a plurality of flow channels. Each of the plurality of flow channels comprises an inlet having an inlet height and an outlet having an outlet height. The inlet height is larger than the outlet height. The filter media defines an inlet face having an inlet face area and an outlet face having an outlet face area. The inlet face is structured to receive air to be filtered. The outlet face is structured to output filtered air. The inlet face area is larger than the outlet face area.

18 Claims, 23 Drawing Sheets

(52) U.S. Cl.
CPC ........ *B01D 46/0005* (2013.01); *B01D 46/526* (2013.01); *B01D 2265/06* (2013.01); *B01D 2275/206* (2013.01); *B01D 2279/60* (2013.01)

(56) References Cited

U.S. PATENT DOCUMENTS

| | | | | |
|---|---|---|---|---|
| 4,710,297 | A * | 12/1987 | Suzuki | B01D 29/012 210/493.2 |
| 4,925,561 | A * | 5/1990 | Ishii | B01D 46/2451 210/493.3 |
| 5,632,792 | A * | 5/1997 | Haggard | B01D 46/0002 210/493.1 |
| 5,851,250 | A * | 12/1998 | Sugie | B01D 39/1661 55/523 |
| 6,238,561 | B1 * | 5/2001 | Liu | B01D 46/0001 210/492 |
| 6,375,700 | B1 | 4/2002 | Jaroszczyk et al. | |
| 6,953,124 | B2 * | 10/2005 | Winter | B01D 46/0012 210/445 |
| 7,052,532 | B1 * | 5/2006 | Liu | F01N 3/0224 96/154 |
| 7,314,558 | B1 * | 1/2008 | Jaroszczyk | B01D 46/0067 210/487 |
| 7,959,702 | B2 | 6/2011 | Rocklitz et al. | |
| 8,057,669 | B2 | 11/2011 | Beard et al. | |
| 8,397,920 | B2 | 3/2013 | Moy et al. | |
| 8,673,137 | B2 | 3/2014 | Verdegan et al. | |
| 9,072,992 | B2 | 7/2015 | Mendel et al. | |
| 10,105,632 | B2 * | 10/2018 | Savstrom | B01D 46/522 |
| 10,112,130 | B2 * | 10/2018 | Savstrom | B01D 29/21 |
| 2002/0083692 | A1 * | 7/2002 | Richerson | B01D 46/10 55/521 |
| 2002/0174770 | A1 | 11/2002 | Badeau et al. | |
| 2006/0060512 | A1 | 3/2006 | Astle et al. | |
| 2009/0045106 | A1 | 2/2009 | Kuennen et al. | |
| 2011/0113736 | A1 | 5/2011 | Raether et al. | |
| 2012/0079798 | A1 | 4/2012 | Rafi et al. | |
| 2012/0118814 | A1 * | 5/2012 | Moy | B01D 46/522 210/493.1 |
| 2013/0180898 | A1 | 7/2013 | Chajec et al. | |
| 2016/0144310 | A1 | 5/2016 | Movia et al. | |
| 2017/0028339 | A1 * | 2/2017 | Savstrom | B01D 46/2411 |
| 2017/0056794 | A1 | 3/2017 | Chernov et al. | |
| 2017/0065910 | A1 | 3/2017 | Chernov et al. | |
| 2017/0080363 | A1 | 3/2017 | Krause et al. | |

FOREIGN PATENT DOCUMENTS

| | | |
|---|---|---|
| JP | 2010-264403 A | 11/2010 |
| WO | WO-2010/024968 | 3/2010 |

* cited by examiner

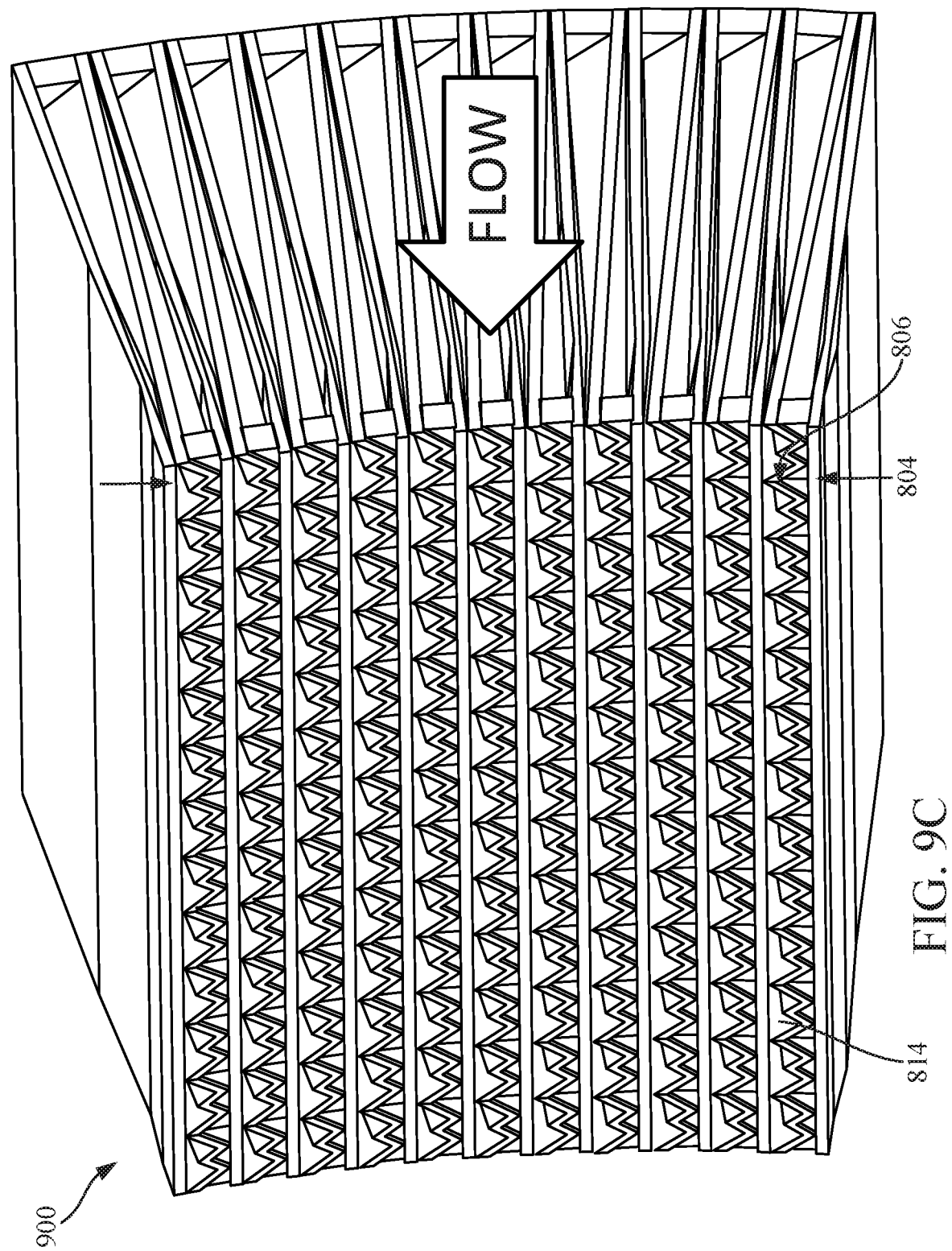

FILTER ELEMENT WITH TAPERED PERIMETER

CROSS-REFERENCE TO RELATED PATENT APPLICATION

The present application is a national stage of PCT Application No. PCT/US2017/041549, filed Jul. 11, 2017, which claims the benefit of priority to U.S. Provisional Patent Application No. 62/361,922, filed Jul. 13, 2016. The contents of both applications are hereby incorporated by reference in their entirety and for all purposes.

TECHNICAL FIELD

The present application relates to filter elements for use with filtration systems.

BACKGROUND

Internal combustion engines generally combust a mixture of fuel (e.g., gasoline, diesel, natural gas, etc.) and air. Prior to entering the engine, intake air is typically passed through a filter element to remove contaminants (e.g., particulates, dust, water, etc.) from the intake air prior to delivery to the engine. The filter element requires periodic replacement as the filter media of the filter element captures and removes particulate from the intake air passing through the filter media. Accordingly, the filter element is typically removably received in the housing to facilitate easy replacement.

Air filter housings are often designed with significant space constraints in mind. Some air filter housings are manufactured through a plastic injection-molding process. Accordingly, the housing parts have a slight draft angle (e.g., approximately 1-3° per side) to facilitate removal of the molded part from the mold during manufacturing. In addition, heavy truck air induction systems generally have a very large effective inlet diameter at the hood plenum connection and then taper or step down to about smaller outlet at the air inlet to the internal combustion engine (e.g., the turbo connection). The resulting tapered shape of filter housings results in difficult design considerations for filter elements received within the housings.

SUMMARY

Various example embodiments relate to filter elements. One such filter element includes filter media having a plurality of flow channels. Each of the plurality of flow channels comprises an inlet having an inlet height and an outlet having an outlet height. The inlet height is larger than the outlet height. The filter media defines an inlet face having an inlet face area and an outlet face having an outlet face area. The inlet face is structured to receive air to be filtered. The outlet face is structured to output filtered air. The inlet face area is larger than the outlet face area.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 9C shows a rear view of an outlet face of the layered filter media pack with coaxial, cylindrical flow faces of FIG. 9A.

DETAILED DESCRIPTION

Referring to the figures generally, a filtration system having a filter element removably received in a housing is described. The housing includes a housing body having housing side walls that are angled by a draft angle. The filter element is comprised of filter media having a plurality of flow channels. The flow channels have larger inlet openings than outlet openings. Accordingly, the filter element has an inlet flow face that has a greater area than the outlet flow face. The resulting filter element has angled side walls. The angled side walls of the filter element may match the draft angle of the housing body thereby maximizing the amount of filter media received in the housing.

Figure 1:
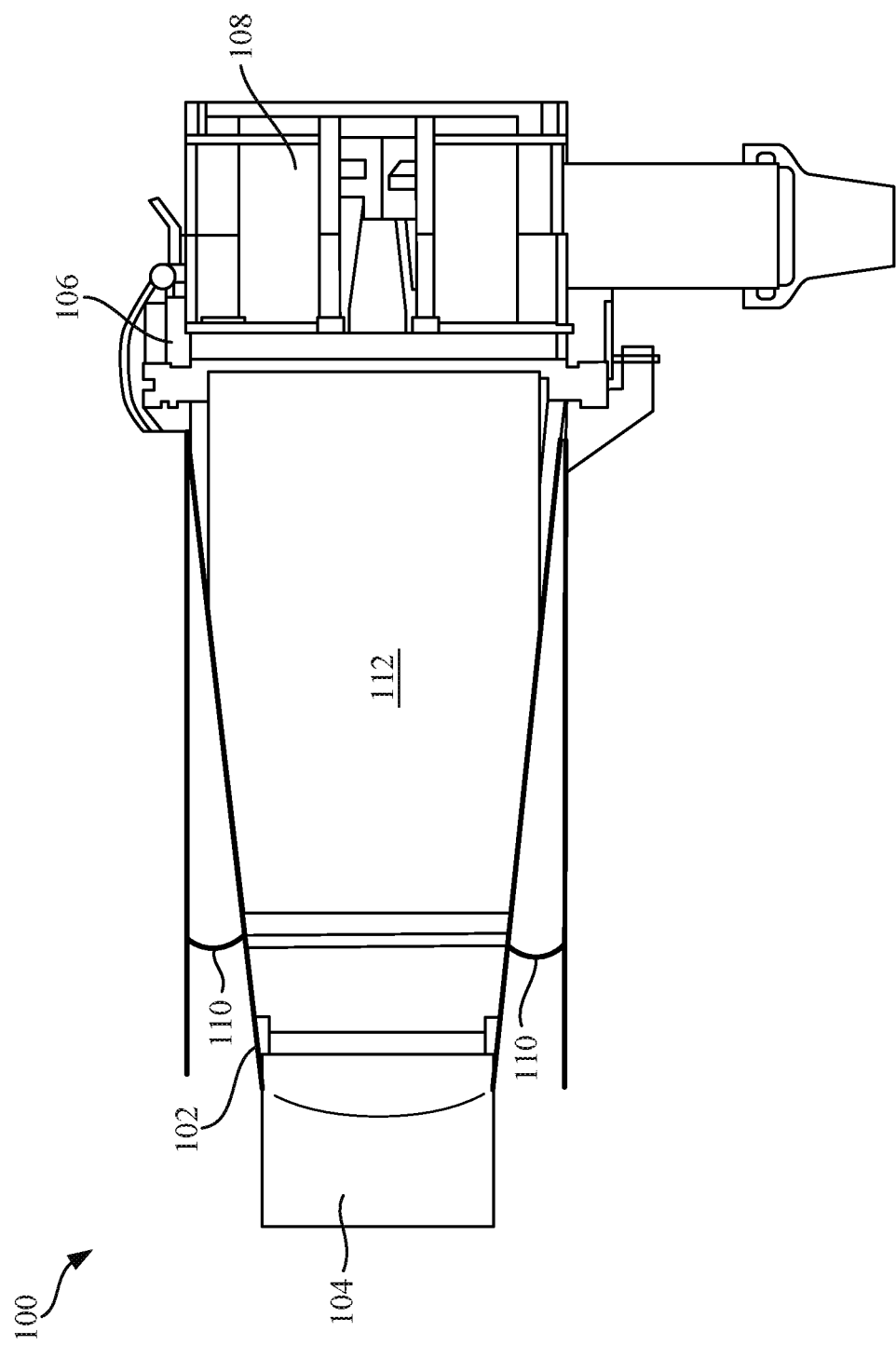
FIG. 1 shows a cross-sectional view of a filter housing according to an example embodiment.

Referring to FIG. 1, a cross-sectional view of a filter housing 100 is shown according to an example embodiment. The filter housing 100 includes a housing body 102 defining an outlet 104 and a cover 106 defining an inlet 108. In some arrangements, the housing body 102 and the cover 106 are manufactured with injection-molded plastic. Accordingly, the side walls of the housing body 102 are slightly angled or tapered by a draft angle 110 to allow for removal of the housing body 102 from the mold. In some arrangements, the draft angle 110 is at least one degree. In other arrangements, the draft angle 110 is between two and four degrees. In further arrangements, the draft angle 110 is up to twenty degrees. The draft angle 110 for each side wall may be different or the same. In some arrangements, the side walls form a substantially cylindrical shape (i.e., a cylindrical shape with a circumferential wall angled by the draft angle 110 with respect to perpendicular to the inlet face or outlet face). The draft angle 110 of the side walls of the housing body 102 results in a filter compartment 112 that is wider at a first end (the end closest to the inlet 108) and narrower at a second end (the end closest to the outlet 104). As described below, a filter element installed in the filter compartment 112 includes a matching taper (i.e., side walls of the filter element are angled to match the draft angle 110) to maximize filtration capacity of the filtration system.

Figure 2:
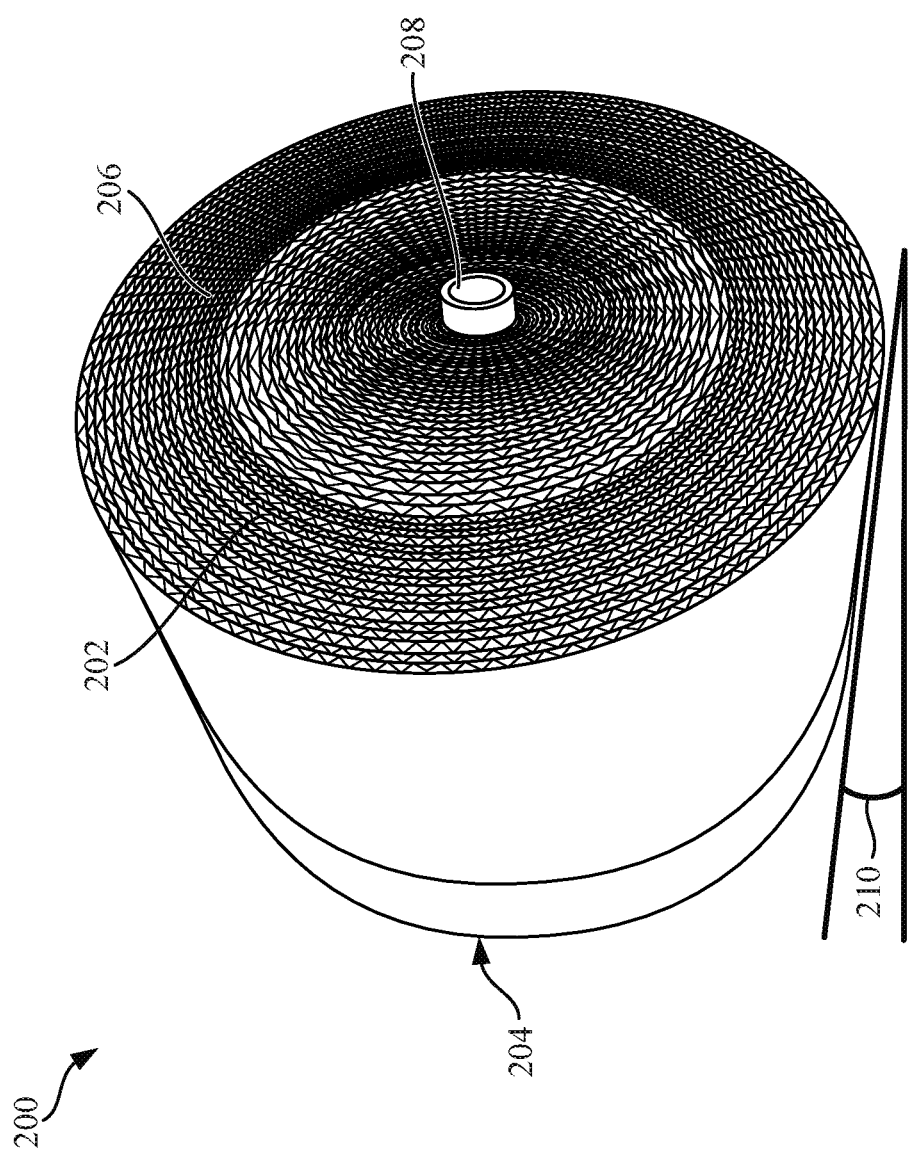
FIG. 2 shows a perspective view of a coiled filter element according to an example embodiment.

Referring to FIG. 2, a perspective view of a filter element 200 is shown according to an example embodiment. The filter element 200 is a coiled cylindrical filter element having an inlet face 202 and an outlet face 204. The filter element 200 includes an inlet face 202 that has a larger diameter than the outlet face 204. The filter element 200 comprises filter media 206 coiled around a central core 208. The filter media 206 includes a plurality flow channels. In some arrangements, the flow channels of the filter media are alternately sealed at the inlet face 202 and the outlet face 204. Air to be filtered flows into the inlet face 202, and filtered air exits the outlet face 204. As described in further detail below, the inlet flow channel height is greater than the outlet flow channel height, which results in the inlet face 202 having an inlet diameter that is larger than the outlet diameter of the outlet face 204. Accordingly, the filter element 200 has a side wall (e.g., the circumferential wall) that has a draft angle 210 (i.e., the side wall is angled with respect to the inlet face 202 and the outlet face 204 at non-perpendicular angles resulting in a tapered shape of the filter element). In some arrangements, the draft angle 210 is the same as the draft angle 110 of the filter housing 100. In some arrangements, the diameter of the inlet face 202 is 254 mm and the diameter of the outlet face 204 is 227 mm.

Figure 3A:
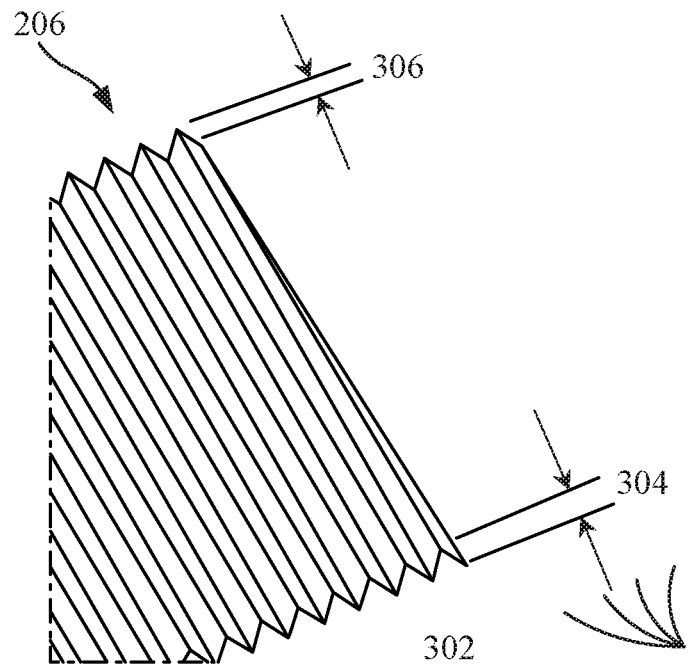
FIG. 3A shows a representation of the filter media of the filter element of FIG. 2 in an uncoiled and unlayered state.
Figure 3B:
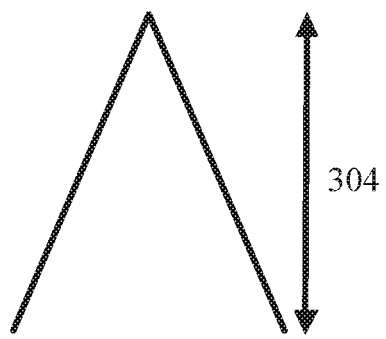
FIG. 3B is a representation of the cross-section of an individual flow channel at the inlet thereof.

Referring to FIG. 3A, a view of the filter media 206 is shown in an uncoiled and unlayered state. As discussed above, the filter media 206 includes a plurality of flow channels 302. Each of the flow channels is open and closed on opposite sides of the filter media 206 as immediately adjacent flow channels. Each of the flow channels 302 has an inlet height 304 of an inlet that receives air to be filtered, and an outlet height 306 of an outlet. In this context, the respective heights refer to a distance from the lowermost point of the "v" in the cross-section of the flow channel (at the respective inlet or outlet) to the uppermost point in the same "v," along an axis that is substantially perpendicular to a longitudinal length of the filter media 206 in the general direction of the bend lines of the filter media 206. This is represented (with respect to the inlet height 304) in FIG. 3B.

Figure 4:
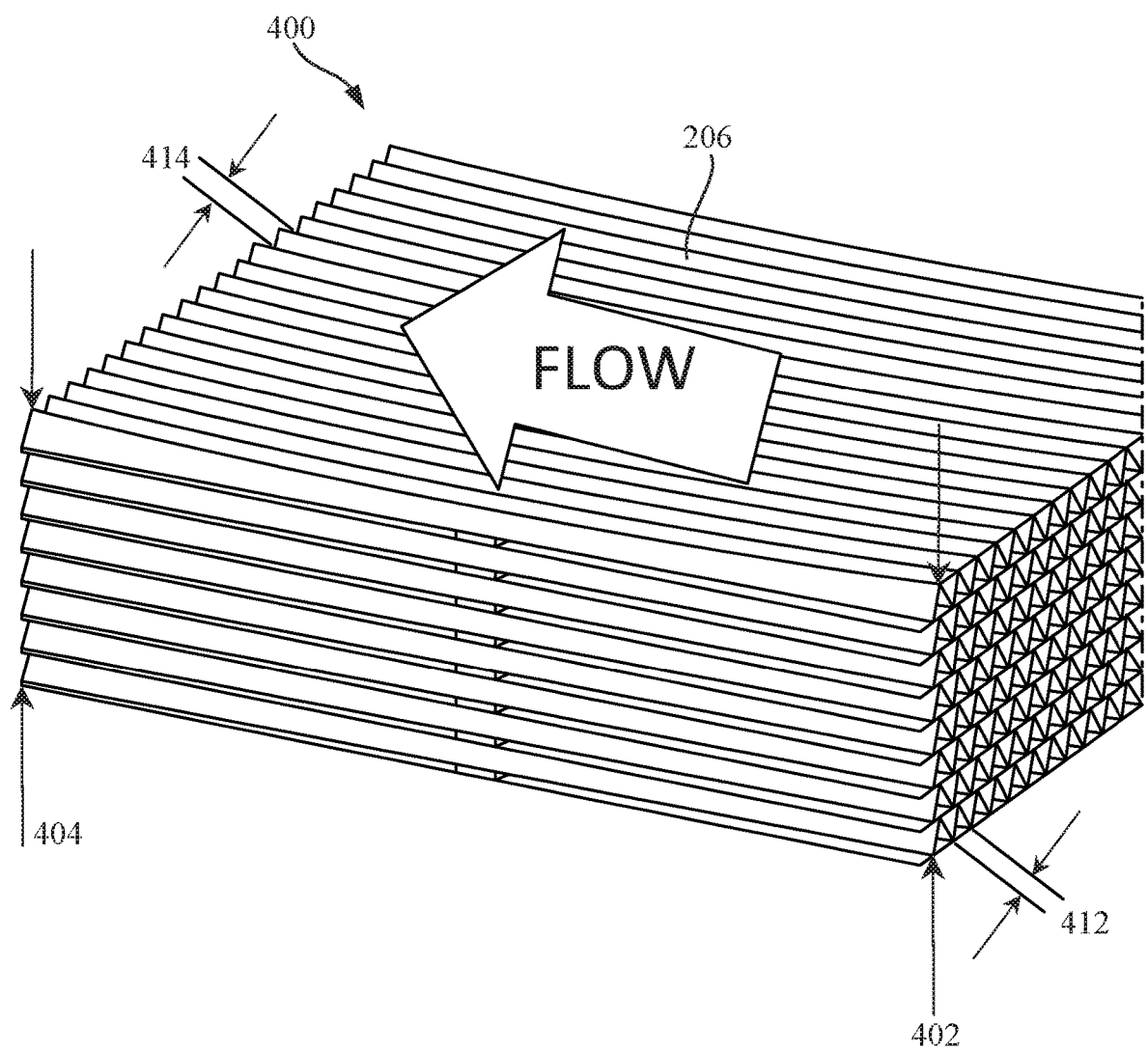
FIG. 4 shows a perspective view of a layered filter media pack comprised of the filter media of FIG. 2.

The inlet height 304 is larger than the outlet height 306. Accordingly, when the filter media 206 is coiled (e.g., as shown in FIG. 2) or layered (e.g., as shown in FIG. 4), the resulting filter media block has a larger inlet face than outlet face. The height differential is formed by forming a deeper tetrahedral shape (or deeper corrugations in the media) toward the inlet edge of the filter media 206 than the outlet edge of the filter media 206. In some arrangements, the inlet height 304 is 2.80 mm and the outlet height is 2.50 mm. The greater inlet height 304 serves to reduce restriction and improve dust loading characteristics (i.e., filter capacity) in a similar manner to how a fanned pleat in a cylindrical filter element demonstrates increased performance than the same filter media arranged in a block or panel.

Figure 7:
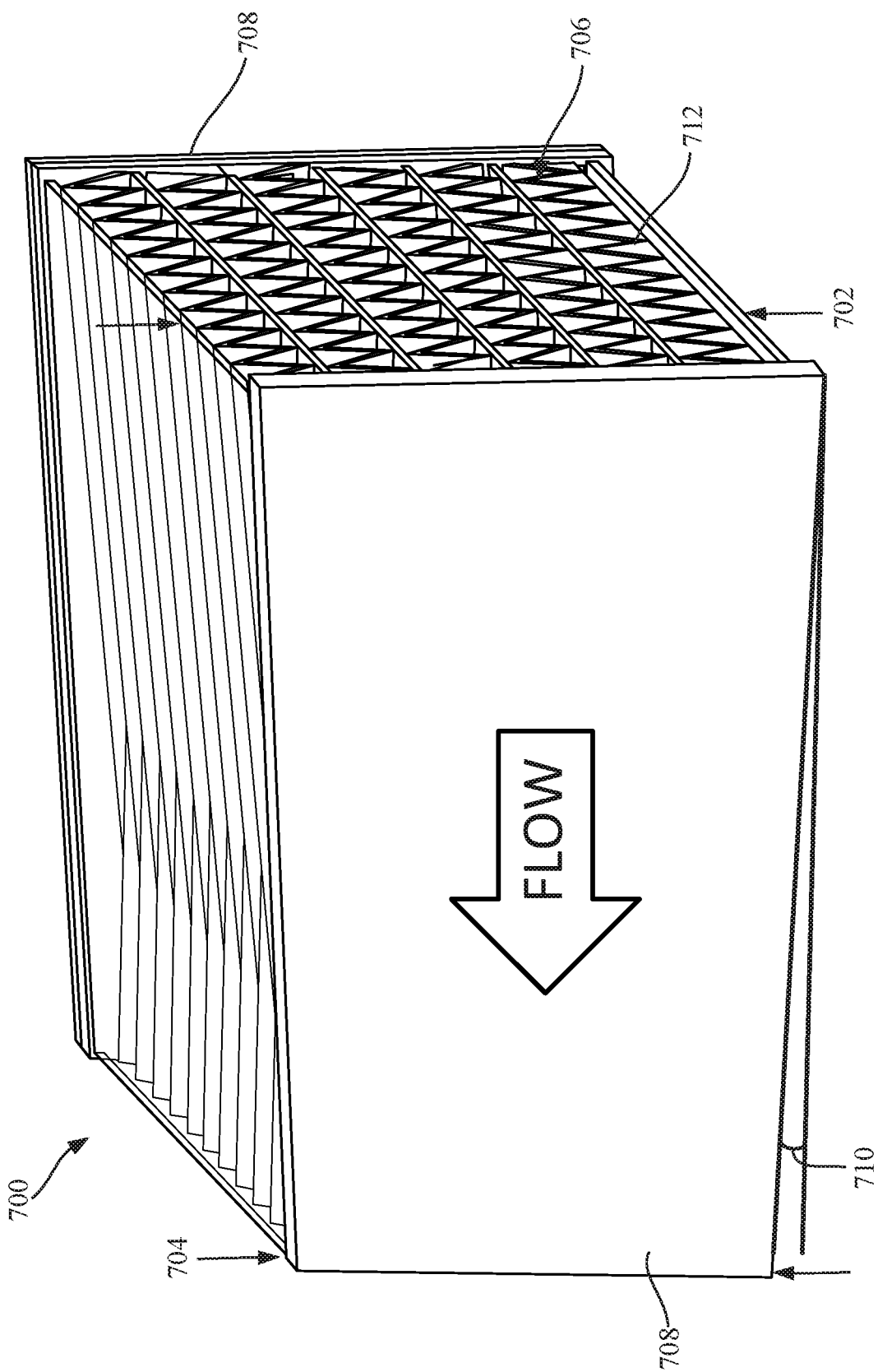
FIG. 7 shows a perspective view of a layered filter media pack with a flat planar flow face comprised of a filter media, according to another example embodiment.

In some arrangements, the flow channels 302 comprise tetrahedron flow channels, such as those described in U.S. Pat. No. 8,397,920, which is herein incorporated by reference in its entirety and for all purposes. In such arrangements, the filter media 206 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Referring to FIG. 7, and as described in greater detail below, the tetrahedron flow channels may be asymmetrically formed to create the height differential between the inlet and outlet channels. Specific arrangements of such tetrahedral filter media are further described in U.S. Pat. No. 8,397,920. In an alternate arrangement, the flow channels 302 comprise flutes that are alternately sealed at the upstream and downstream ends.

Referring again to FIG. 2, when the filter media 206 is coiled about the central core, the inlet face 202 has a larger surface area than the outlet face 204. The tapered side wall of the filter element 200 lines up with the tapered side walls of the housing body 102 thereby allowing the filter element 200 to only be inserted in one orientation. Accordingly, the matching tapers of the filter element 200 and the housing body 102 serve as an engine integrity protection feature by ensuring that the filter element 200 is inserted into the housing body 102 in the proper orientation and by ensuring that only approved filter elements having the appropriate taper can fit into the housing body 102. The tapering side wall of the filter element 200 also permits a radial seal to be positioned around the perimeter of the filter media pack without an additional extension or frame member to support the seal. In some arrangements, a sufficiently stretchable flat sheet may be used to assist in the process of weaving the filter media 206 around the central core in order to prevent tearing or wrinkling of the inlet face 202 or the outlet face 204.

Although the filter element 200 of FIG. 2 is a coiled cylindrical filter element, the filter media 206 can also be used to create non-cylindrical coiled filter elements (e.g., racetrack, oblong, polyhedron, etc.). In further arrangements, the filter media 206 is layered to form non-coiled (e.g., rectangular, square, triangular, etc.) filter elements having a larger inlet face than the outlet face. One such arrangement is shown in FIG. 4, which shows a filter media pack (e.g., a filter element) 400. The filter media pack 400 comprises layered filter media 206. As shown in FIG. 4, the filter media pack 400 has a rectangular inlet face 402 and a rectangular outlet face 404. Since, the inlet height 304 of the filter media 206 is larger than the outlet height 306, the inlet width 412 of the filter media pack 400 is larger than the outlet width 414. In some arrangements, the difference between the inlet width 412 and the outlet width 414 is 3 mm per ten layers of the filter media 206. In such arrangements, a ten layer filter media pack 400 may have an inlet width 412 of 28 mm and an outlet width 414 of 25 mm. In some arrangements, the filter media pack 400 has an overall polyhedron shape.

Figure 5:
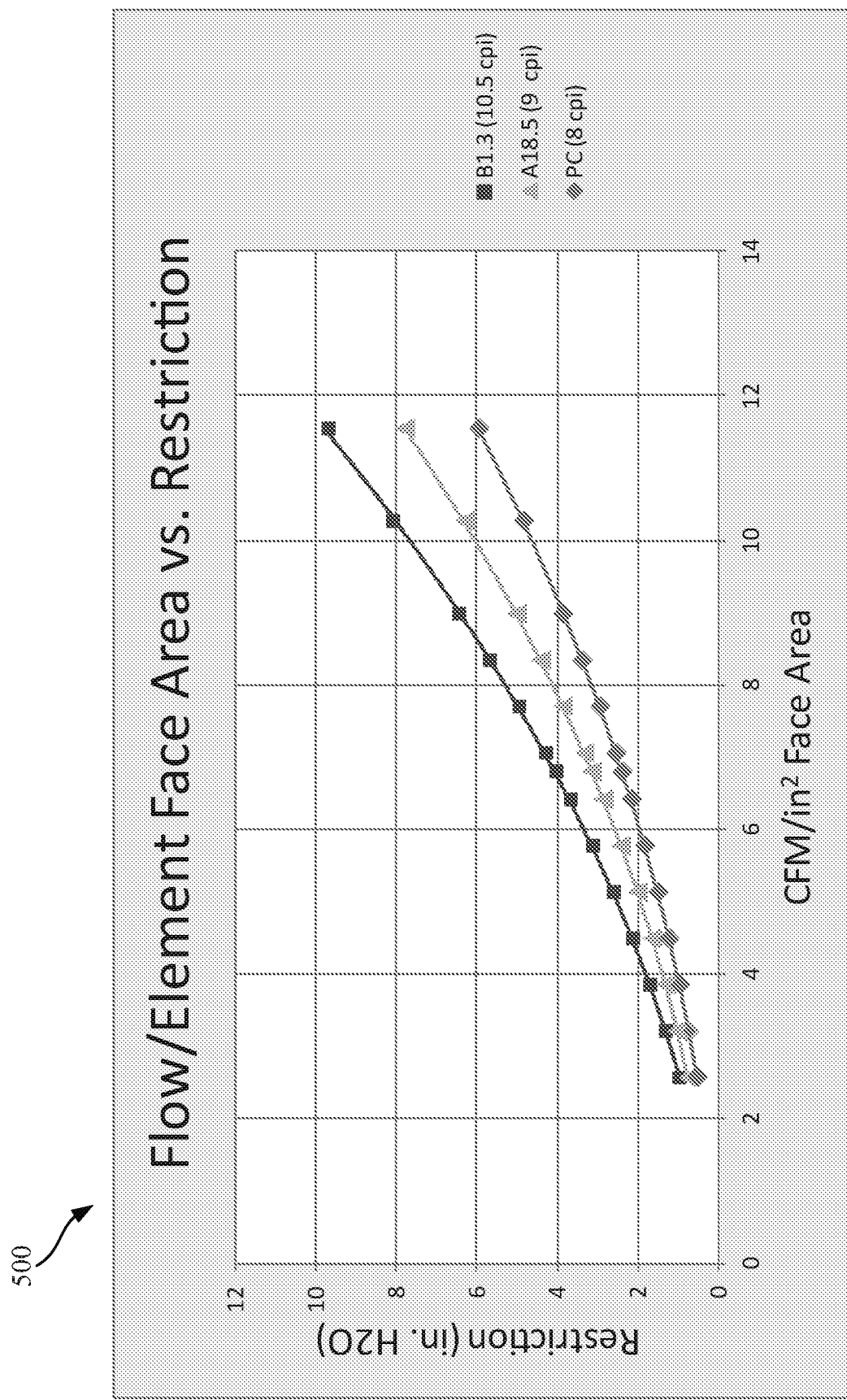
FIG. 5 shows a graph showing the effect of increased face area of a filter element on restriction of the filter element.

Referring to FIG. 5, a graph 500 showing the effect of increased face area of a filter element on restriction of the filter element. The graph 500 compares the flow per face area (in CFM/in$^2$) of a filter element to the restriction (in inches of $H_2O$). As shown in the graph, a 10% increase in inlet face area may result in nearly an 8% reduction in restriction.

The above-described filter element 200 and filter media pack 400 have a larger inlet flow face area than outlet flow face area. The differences between the inlet flow face area and the outlet flow face area is caused by the varying channel height of the filter media 206. The larger inlet flow face area reduces the restriction of the filter element 200 and filter media pack 400 and improves dust loading characteristic by creating a similar effect to fanning the pleats of filter media. Additionally, the filter element 200 and filter media pack 400 maximize the use of the filter compartments formed by filter housing walls having draft angles caused by the injection molding process.

Figure 6A:
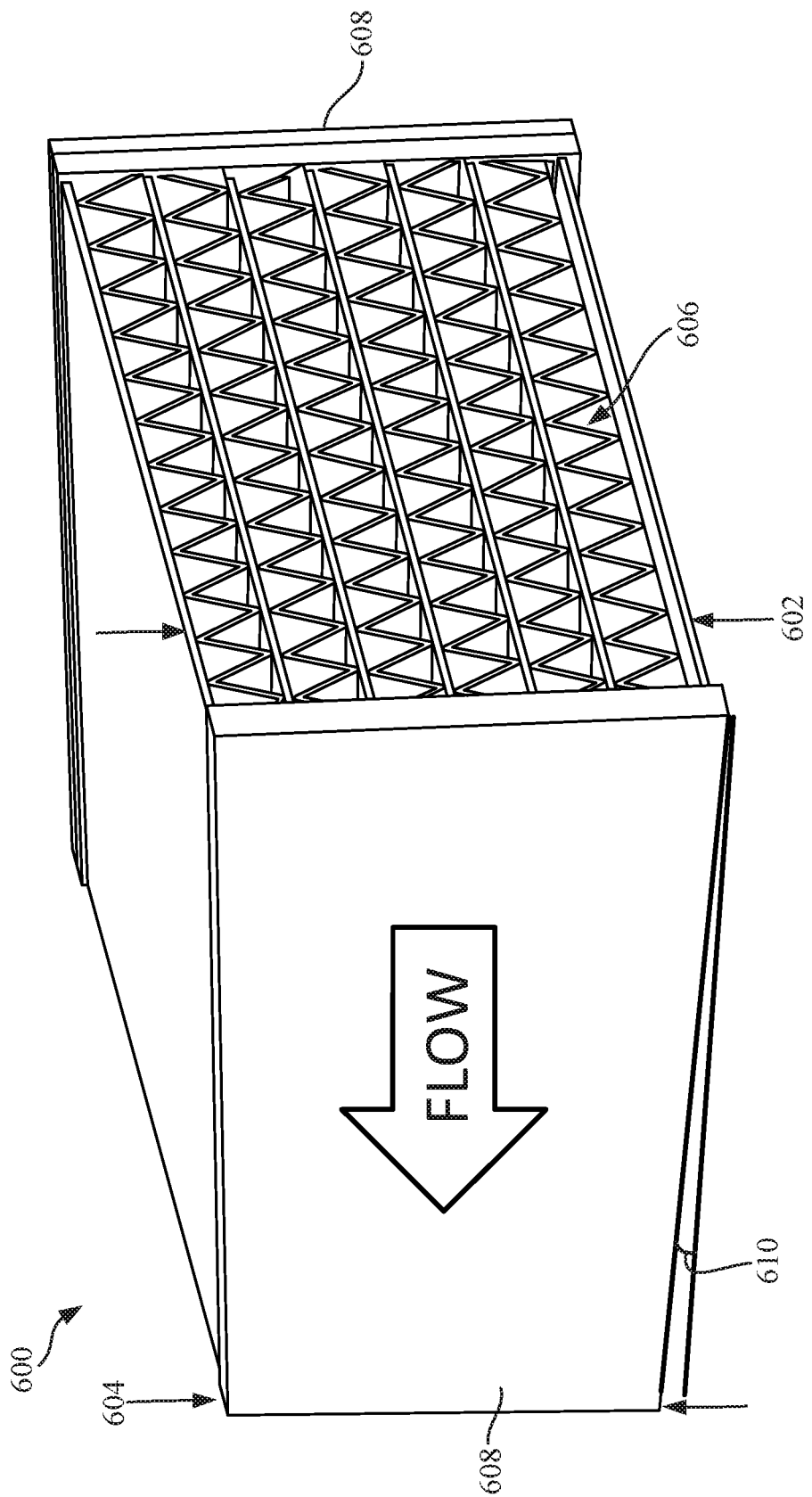
FIG. 6A shows a perspective view of a layered filter media pack with a flat planar flow face comprised of a filter media, according to an example embodiment.

Referring to FIG. 6A, a perspective view of a layered filter media pack 600 with a flat planar flow face comprised of a filter media 606 is shown, according to an example embodiment. As shown in FIG. 6A, the filter media pack 600 has a rectangular inlet face 602, a rectangular outlet face 604, sealed side walls 608, and the filter media 606. The filter media 606 is similar to the filter media 206. A difference is the outlet channels of the filter media 606 are "w" shaped instead of "v" shaped. In some arrangements, the filter media 606 of the filter media pack is the filter media 206. As shown in FIG. 6A, the filter media pack 600 comprises filter media 606 layered in a manner that creates a generally flat planer surface at both the rectangular inlet face 602 and the rectangular outlet face 604. Since the inlet height of the filter media 606 is larger than the outlet height, the inlet width of the inlet face 602 is larger than the outlet width of the outlet face 604. In some arrangements, the difference between the inlet width of the inlet face 602 and the outlet width of the outlet face 604 is 3 mm per ten layers of the filter media 606. In such arrangements, a ten layer filter media pack 600 may have an inlet width of the inlet face 602 of 28 mm and an outlet width of the outlet face 604 of 25 mm. In some arrangements, the filter element 600 has an overall polyhedron shape. In some arrangements, the flow channels of the filter media 606 are alternately sealed at the inlet face 602 and the outlet face 604.

Figure 6B:
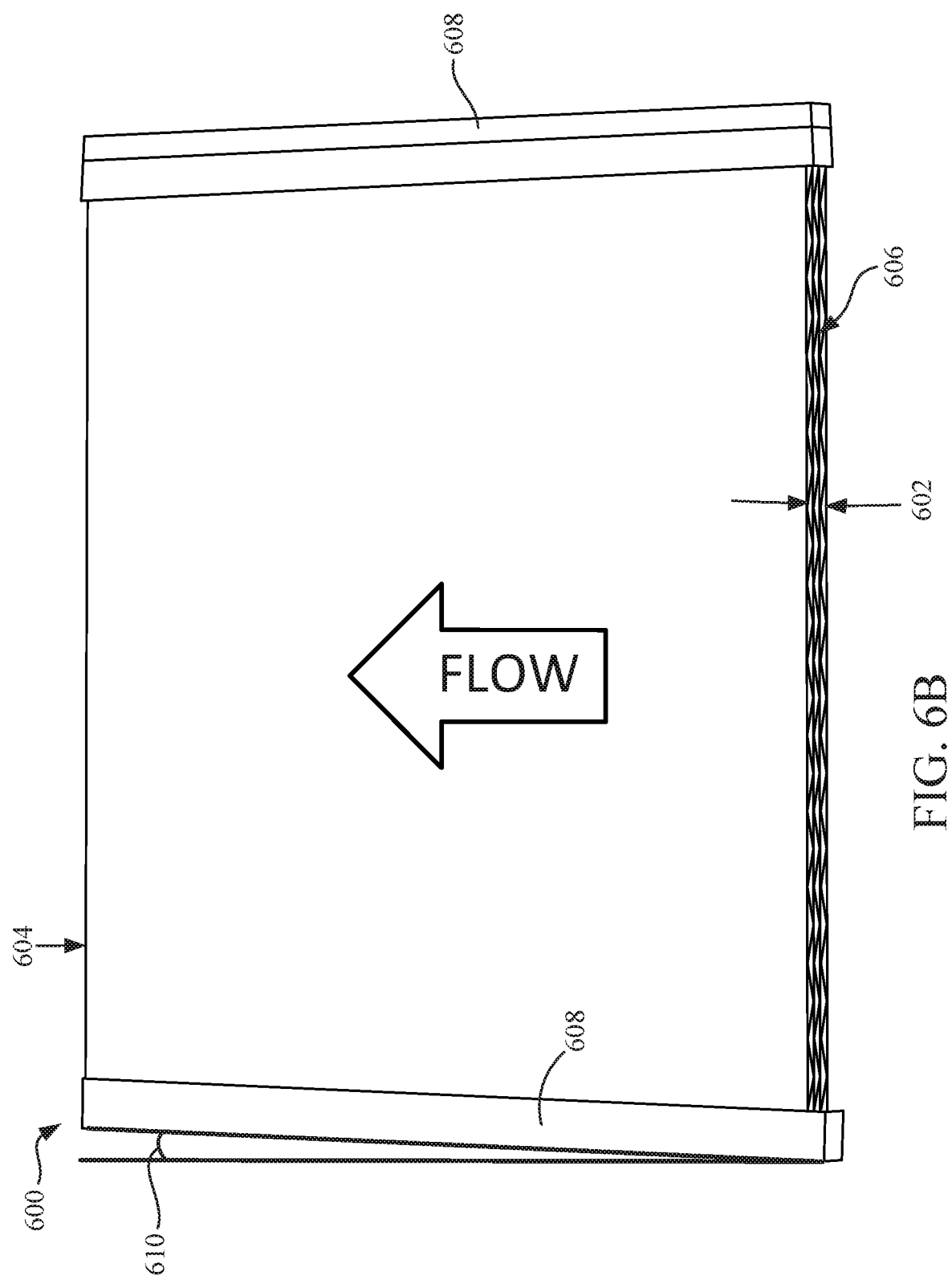
FIG. 6B shows a top plan view of the layered filter media pack with a flat planar flow face of FIG. 6A.

The filter media pack 600 comprises sealed side walls 608 (e.g., the two rectangular walls) that each have a draft angle 610 (i.e., the side wall is angled with respect to the inlet face 602 and the outlet face 604 at substantially non-perpendicular angles resulting in a tapered shape of the filter media pack 600). As shown in greater detail in FIG. 6B, the side walls 608 of the filter media pack 600 may be substantially parallel to each other or may be slightly tapered with respect to the inlet face 602 and the outlet face 604 at non-perpendicular angles. In some arrangements, the draft angle 610 is the same as the draft angle 110 of the filter housing 100 so as to provide an optimized fit into the filter housing 100 with the tapered side walls. The top and bottom of the filter media pack 600 may be substantially 31e1 to each other or may be slightly tapered with respect to the inlet face 602 and the outlet face 604 at non-perpendicular angles.

Figure 6C:
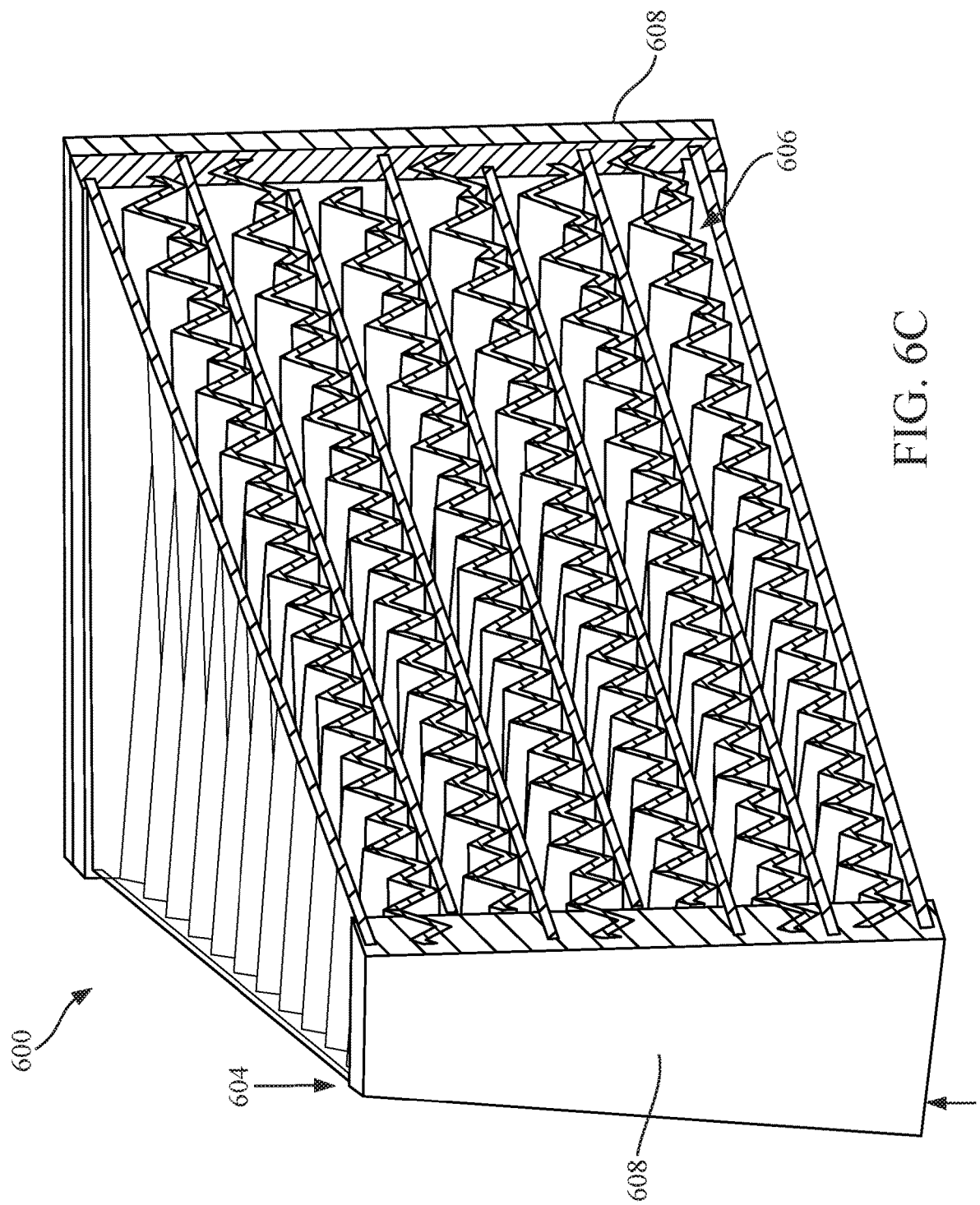
FIG. 6C shows a representation of an angled cross-section of the layered filter media pack with a flat planar flow face of FIG. 6A.

Referring to FIG. 6C, a representation of an angled cross-section of the filter media pack 600 of FIG. 6A is shown. Each of the flow channels of the filter media 606 has an inlet height of an inlet that receives air to be filtered, and an outlet height of an outlet. In this context, the respective inlet heights refer to a distance from the lowermost point of the "v" in the cross-section of the flow channel (at the respective inlet) to the uppermost point in the same "v," along an axis that is substantially perpendicular to a longitudinal length of the filter media 606 in the general direction of the bend lines of the filter media 606. The respective outlet heights refer to a distance from the lowermost point of the "w" in the cross-section of the flow channel (at the respective outlet) to the uppermost point in the same "w," along an axis that is substantially perpendicular to a longitudinal length of the filter media 606 in the general direction of the bend lines of the filter media 606.

Figure 6D:
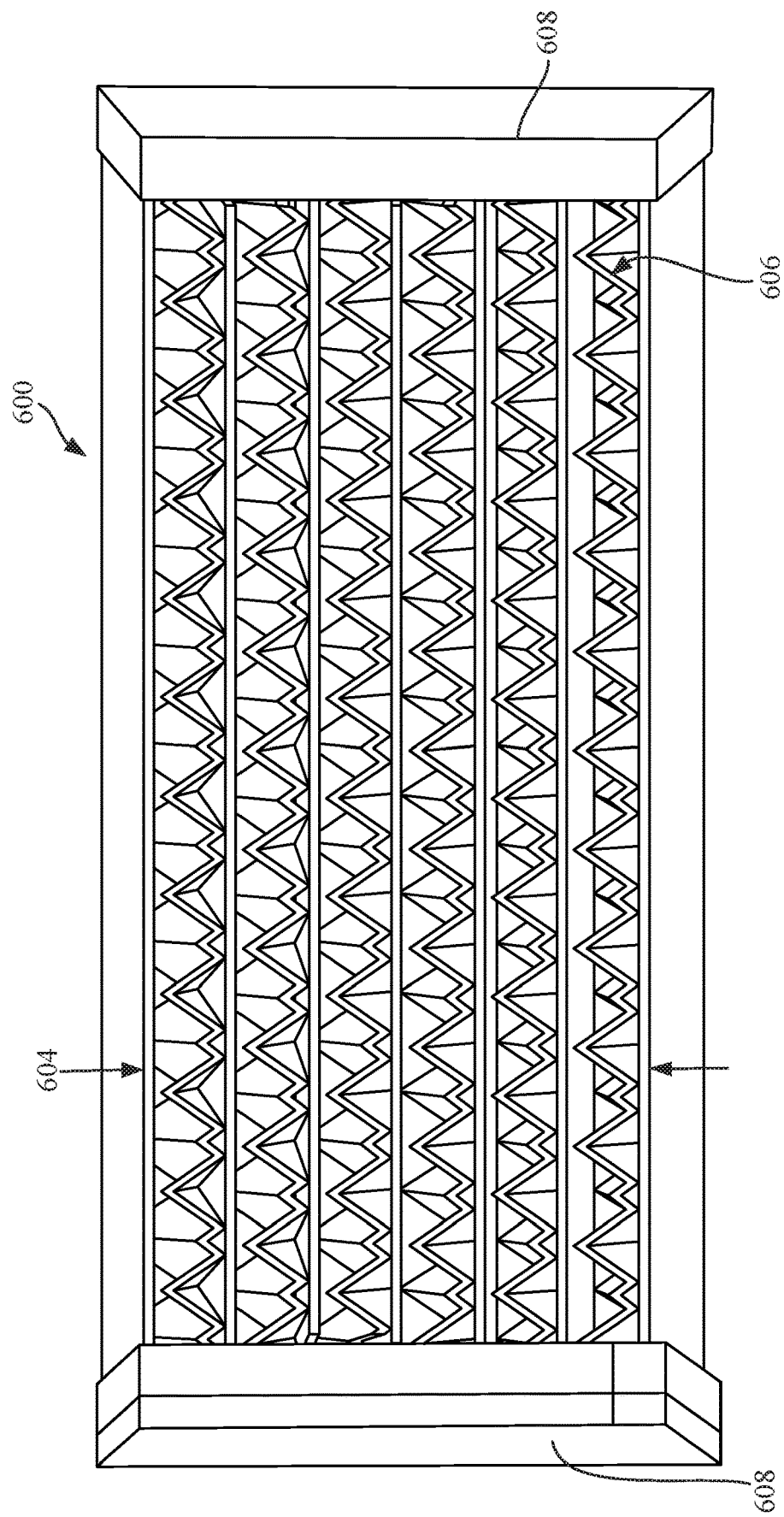
FIG. 6D shows a rear view of an outlet face of layered filter media pack with a flat planar flow face of FIG. 6A.

Referring to FIG. 6D, a rear view of the outlet face 604 of the filter media pack 600 of FIG. 6A is shown. In some arrangements, the filter media 606 may be layered to form coaxial arched or cylindrical flow faces. In these arrangements, the restriction of flow is reduced when the filter media pack 600 is installed in certain housing bodies.

Referring to FIG. 7, a perspective view of a layered filter media pack 700 with a flat planar flow face comprised of a filter media 706 is shown, according to an example embodiment. As shown in FIG. 7, the filter media pack 700 has a rectangular inlet face 702, a rectangular outlet face 704, sealed side walls 708, and the filter media 706. The filter media pack 700 comprises filter media 706 that comprises tetrahedron flow channels that are asymmetrically formed to create the height differential between the inlet channels 712 and outlet channels (not shown). The filter media 706 is layered in a manner that creates a generally flat planer surface at both the rectangular inlet face 702 and the rectangular outlet face 704. Since the inlet height of the inlet channels 712 of the filter media 706 is larger than the outlet height of the outlet channels of the filter media 706, the inlet width of the inlet face 702 of the filter media pack 700 is larger than the outlet width of the outlet face 704. In some arrangements, the difference between the inlet width of the inlet face 702 and the outlet width of the outlet face 704 is 3 mm per ten layers of the filter media 706. In such arrangements, a ten layer filter media pack 700 may have an inlet width of the inlet face 702 of 28 mm and an outlet width of the outlet face 704 of 25 mm. In some arrangements, the flow channels of the filter media 706 are alternately sealed at the inlet face 702 and the outlet face 704.

The filter media pack 700 comprises sealed side walls 708 (e.g., the two rectangular walls) that each have a draft angle 710 (i.e., the side wall is angled with respect to the inlet face 702 and the outlet face 704 at substantially non-perpendicular angles, resulting in a tapered shape of the filter media pack 700). The sealed side walls 708 of the filter media pack 700 may be substantially parallel to each other or may be slightly tapered with respect to the inlet face 702 and the outlet face 704 at non-perpendicular angles. In some arrangements, the draft angle 710 is the same as the draft angle 110 of the filter housing 100 to provide an optimized fit into the filter housing 100 with the tapered side walls. The top and bottom of the filter media pack 700 may be substantially parallel to each other or may be slightly tapered with respect to the inlet face 702 and the outlet face 704 at non-perpendicular angles.

Figure 8A:
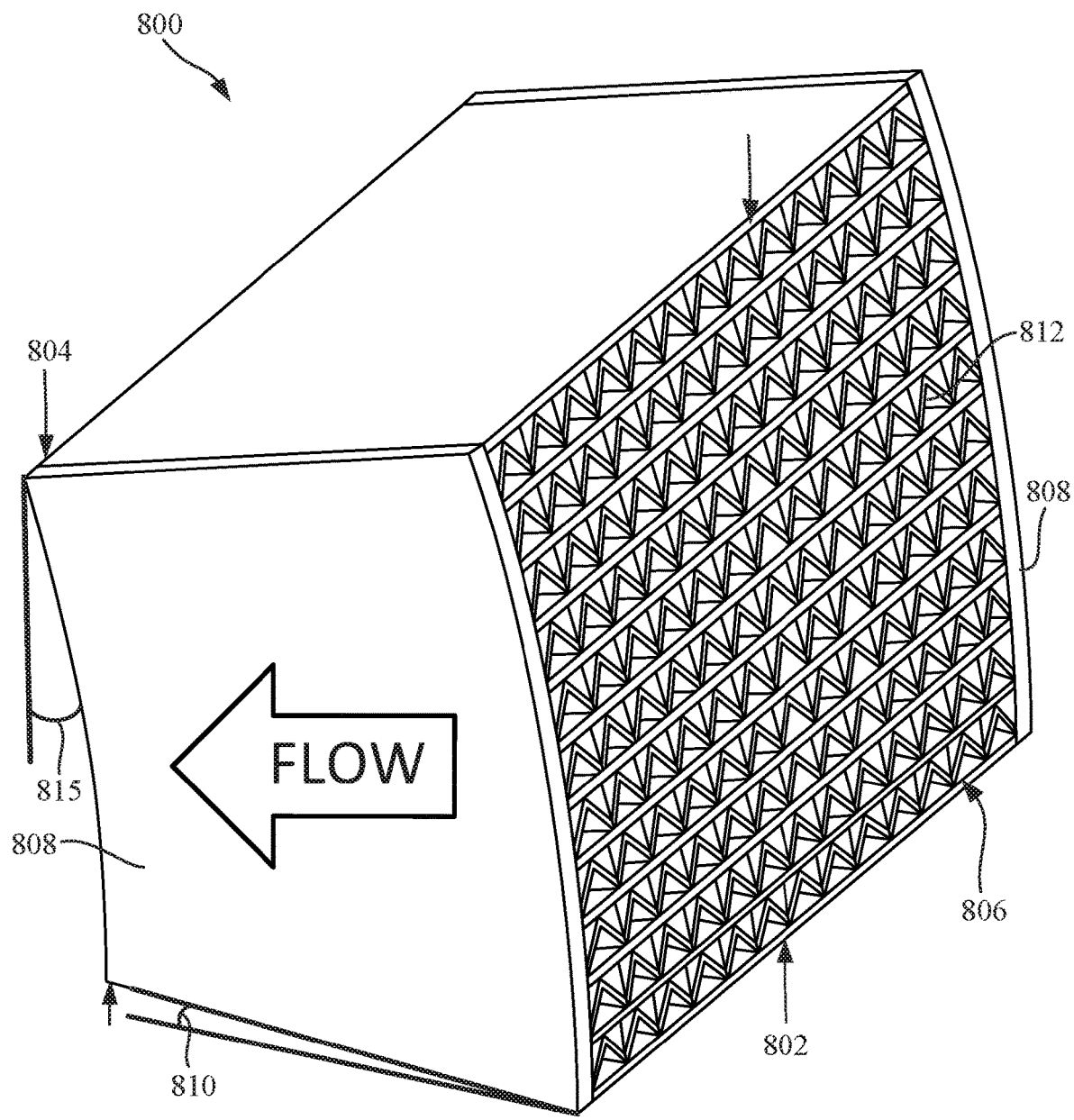
FIG. 8A shows a perspective view of a layered filter media pack with coaxial, cylindrical flow faces comprised of a filter media, according to an example embodiment.

Referring to FIG. 8A, a perspective view of a filter media pack 800 with coaxial, cylindrical flow faces comprised of a filter media 806 is shown, according to an example embodiment. A difference between the filter media pack 800 and the filter media pack 600 is that the substantially rectangular inlet face 802 and the substantially rectangular outlet face 804 are not parallel to each other but rather are substantially coaxial to each other. The filter media 806 is substantially similar to the filter media 606. A difference, due to the coaxial, cylindrical flow face is that the outlet height of the "w" shaped outlet face 804 is shorter than in the filter media 606. As shown in FIG. 8A, the filter media pack 800 has a substantially rectangular inlet face 802, a substantially rectangular outlet face 804, sealed side walls 808, and the filter media 806. Since, the inlet height of the filter media 806 is larger than the outlet height, the inlet width of the inlet face 802 is larger than the outlet width of the outlet face 804. As shown in FIG. 8A, the substantially rectangular inlet face 802 and the substantially rectangular outlet face 804 have a face curvature angle 815. While the substantially rectangular inlet face 802 and the substantially rectangular outlet face 804 are not parallel to each other, individual openings in the inlet channels 812 and outlet channels 814 (not shown) can be parallel (or substantially parallel) to each other and represent surfaces of a generally cylindrical flow face surface. In some arrangements, the flow channels of the filter media 806 are alternately sealed at the inlet face 802 and the outlet face 804.

The filter media pack 800 comprises sealed side walls 808 (e.g., the two substantially rectangular walls) that each have a draft angle 810 (i.e., the side wall is angled with respect to the inlet face 802 and the outlet face 804 at substantially non-perpendicular angles resulting in a tapered shape of the filter media pack 800). The sealed side walls 808 of the filter media pack 800 may be substantially parallel to each other or may be slightly tapered with respect to the inlet face 802 and the outlet face 804 at non-perpendicular angles. In some arrangements, the draft angle 810 is the same as the draft angle 110 of the filter housing 100 to provide an optimized fit into the filter housing 100 with the tapered side walls. The top and bottom of the filter media pack 800 may be substantially parallel to each other or may be slightly tapered with respect to the inlet face 802 and the outlet face 804 at non-perpendicular angles.

Figure 8B:
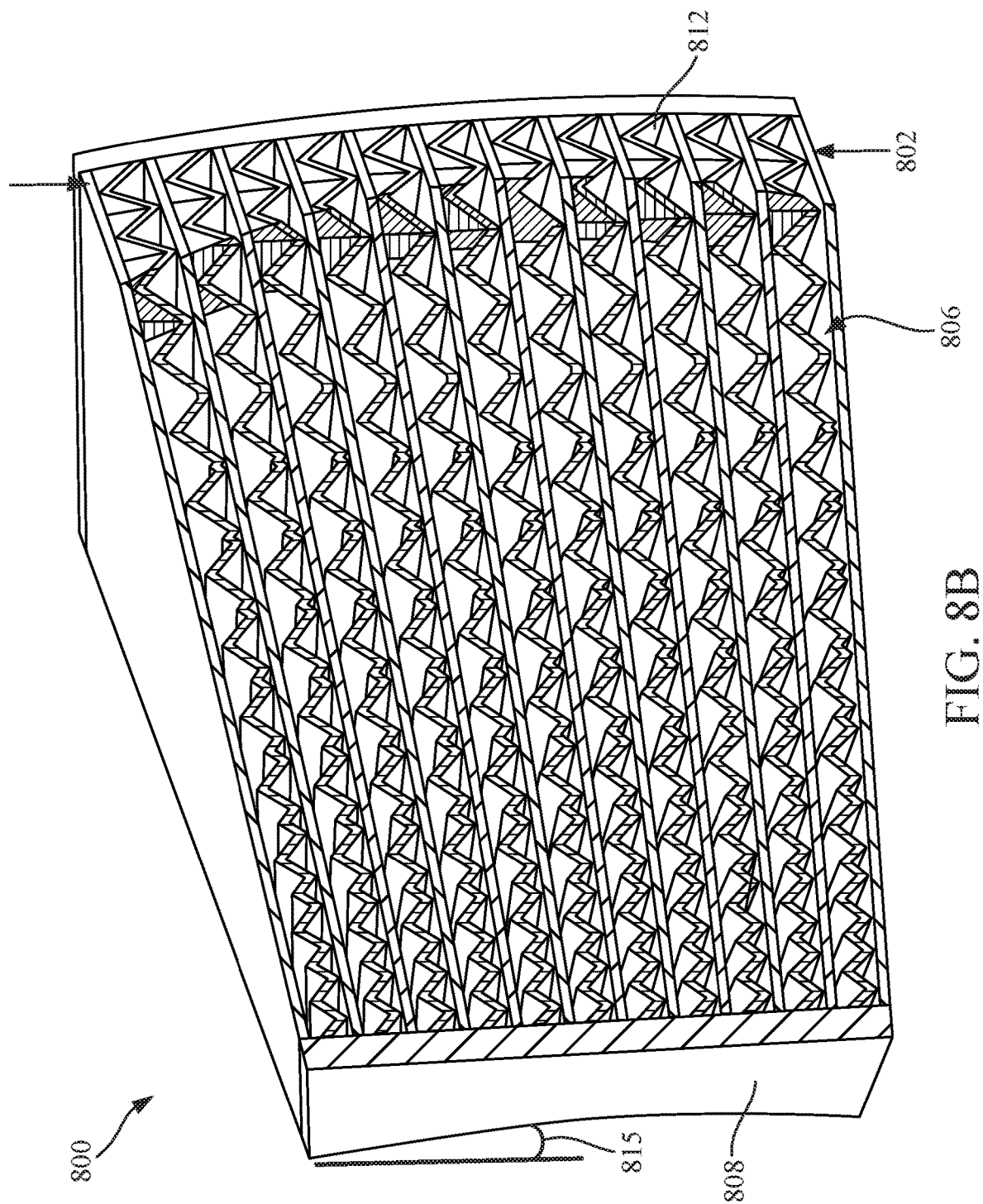
FIG. 8B shows a representation of an angled cross-section of the layered filter media pack with coaxial, cylindrical flow faces of FIG. 8A.

Referring to FIG. 8B, a representation of an angled cross-section of the filter media pack 800 of FIG. 8A is shown. Each of the flow channels of the filter media 806 has an inlet height of an inlet that receives air to be filtered, and an outlet height of an outlet. In this context, the respective inlet heights refer to a distance from the lowermost point of the "v" in the cross-section of the flow channel (at the respective inlet) to the uppermost point in the same "v," along an axis that is substantially perpendicular to a longitudinal length of the filter media 806 in the general direction of the bend lines of the filter media 806. The respective outlet heights refer to a distance from the lowermost point of the "w" in the cross-section of the flow channel (at the respective outlet) to the uppermost point in the same "w," along an axis that is substantially perpendicular to a longitudinal length of the filter media 806 in the general direction of the bend lines of the filter media 806. While the substantially rectangular inlet face 802 and the substantially rectangular outlet face 804 are not parallel to each other, individual openings in the inlet channels 812 and outlet channels (not shown) can be parallel (or substantially parallel) to each other and represent surfaces of a generally cylindrical flow face surface.

Figure 8C:
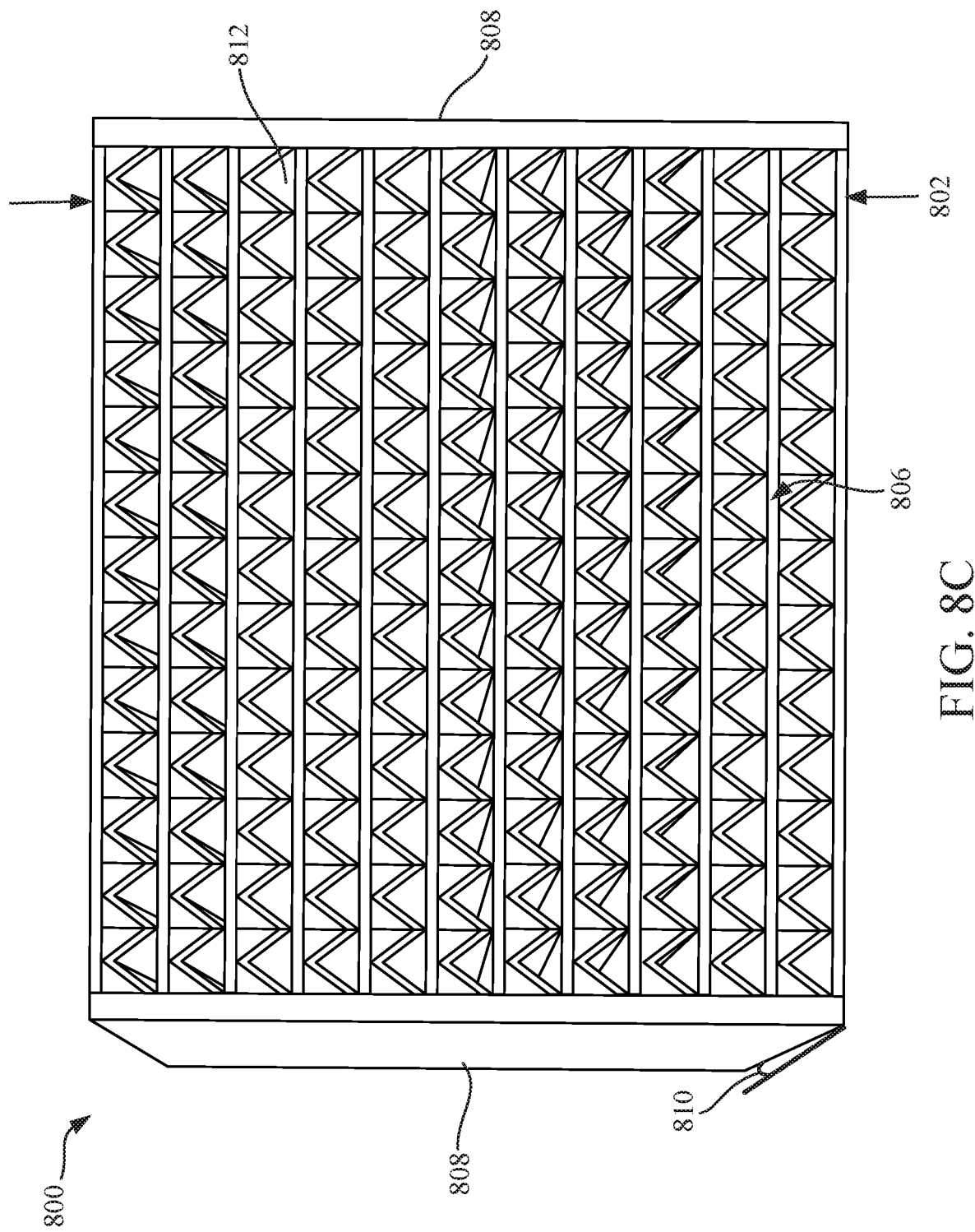
FIG. 8C shows a front view of an inlet face of the layered filter media pack with coaxial, cylindrical flow faces of FIG. 8A.
Figure 8D:
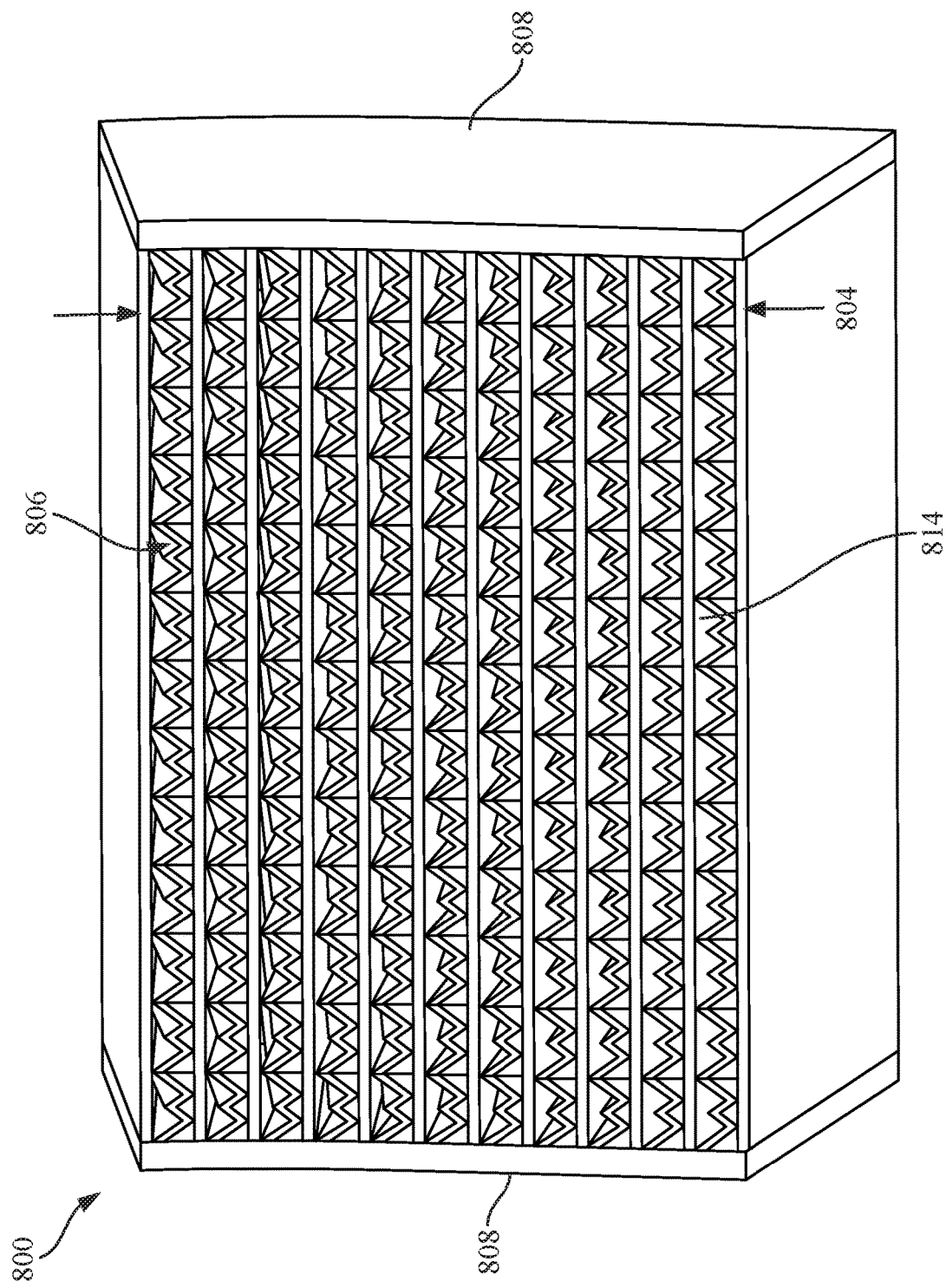
FIG. 8D shows a rear view of an outlet face of the layered filter media pack with coaxial, cylindrical flow faces of FIG. 8A.

Referring to FIG. 8C, a front view of an inlet face 802 with coaxial, cylindrical flow faces of the layered filter media pack 800 of FIG. 8A is shown. Referring to FIG. 8D, a rear view of an outlet face 804 with coaxial, cylindrical flow faces of the layered filter media pack 800 of FIG. 8A is shown. While the substantially rectangular inlet face 802 (not shown) and the substantially rectangular outlet face 804 are not parallel to each other, individual openings in the inlet channels 812 (not shown) and outlet channels 814 can be parallel (or substantially parallel) to each other and represent surfaces of a generally cylindrical flow face surface.

Figure 9A:
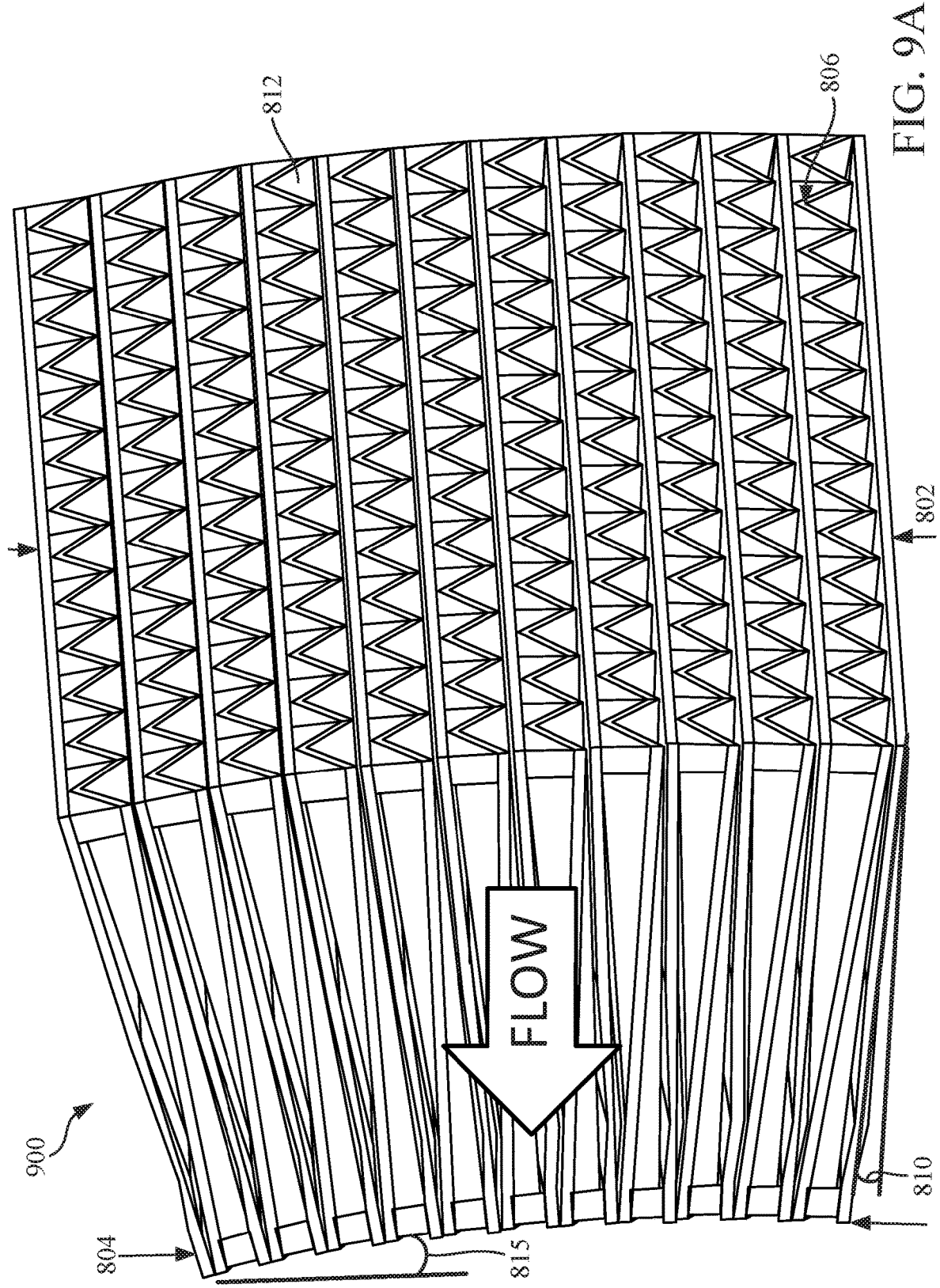
FIG. 9A shows a perspective view of a layered filter media pack with coaxial, cylindrical flow faces comprised of a filter media, according to another example embodiment.

Referring to FIG. 9A, a perspective view of a filter media pack 900 with coaxial, cylindrical flow faces comprised of the filter media 806 is shown, according to an example embodiment. The filter media pack 900 is similar to the filter media pack 800. A difference between the filter media pack 900 and the filter media pack 800 is the lack of side walls on the filter media pack. Accordingly, like numbering is used to designate like parts between the filter media pack 900 and the filter media pack 800. As shown in FIG. 9A, the filter media pack 900 has a substantially rectangular inlet face 802, a substantially rectangular outlet face 804, and the filter media 806. The substantially rectangular inlet face 802 and the substantially rectangular outlet face 804 have a face curvature angle 815. While the substantially rectangular inlet face 802 and the substantially rectangular outlet face 804 are not parallel to each other, individual openings in the inlet channels 812 and outlet channels 814 (not shown) can be parallel (or substantially parallel) to each other and represent surfaces of a generally cylindrical flow face surface. In some arrangements, the flow channels of the filter media 806 are alternately sealed at the inlet face 802 and the outlet face 804.

The filter media pack 900 does not include side walls. However, the end of the flow channels is substantially planar and forms a draft angle 810 (i.e., the end of the flow channels are angled with respect to the inlet face 802 and the outlet face 804 at substantially non-perpendicular angles resulting in a tapered shape of the filter media pack 900). The sides of the filter media pack 900 may be substantially parallel to each other or may be slightly tapered with respect to the inlet face 802 and the outlet face 804 at non-perpendicular angles. In some arrangements, the draft angle 810 is the same as the draft angle 110 of the filter housing 100 to provide an optimized fit into the filter housing 100 with the tapered side walls. The top and bottom of the filter media pack 900 may be substantially parallel to each other or may be slightly tapered with respect to the inlet face 802 and the outlet face 804 at non-perpendicular angles.

Figure 9B:
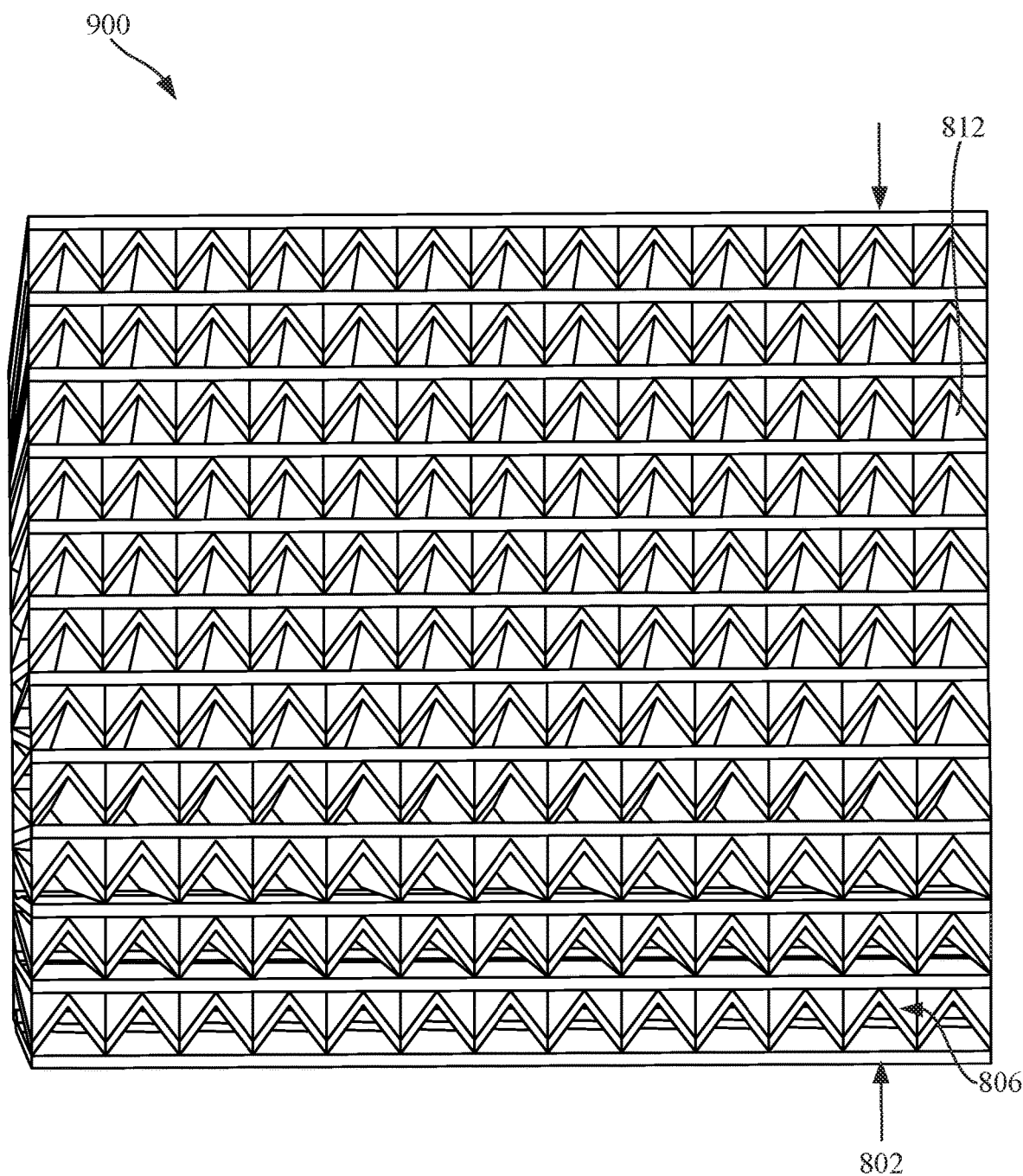
FIG. 9B shows a front view of an inlet face of the layered filter media pack with coaxial, cylindrical flow faces of FIG. 9A.
Figure 9D:
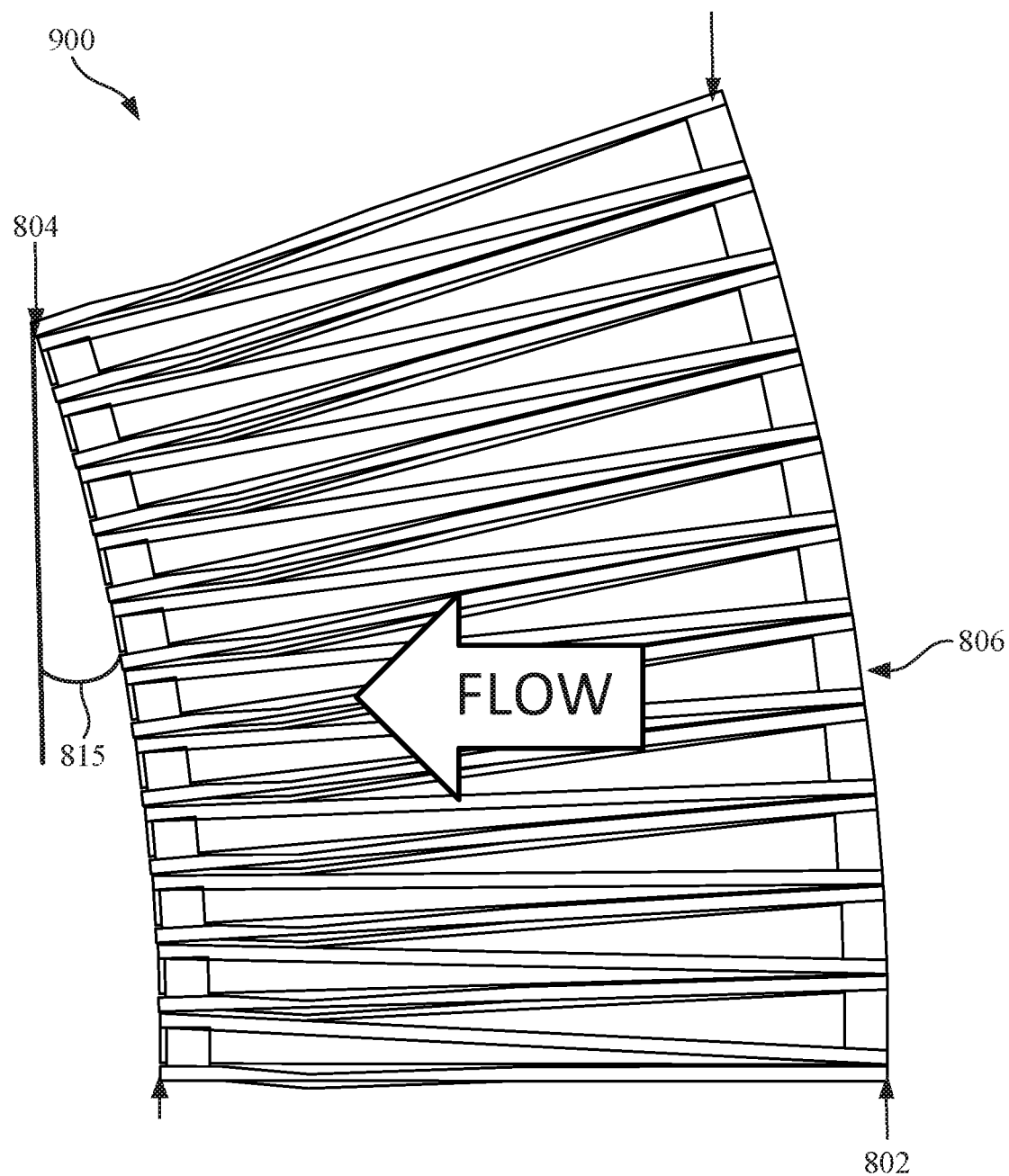
FIG. 9D shows a side view of the layered filter media pack with coaxial, cylindrical flow faces of FIG. 9A.

Referring to FIG. 9B, a front view of an inlet face 802 with coaxial, cylindrical flow faces of the layered filter media pack 900 of FIG. 9A is shown. Referring to FIG. 9C, a rear view of an outlet face 804 with coaxial, cylindrical flow faces of the layered filter media pack 900 of FIG. 9A is shown. While the substantially rectangular inlet face 802 (not shown) and the substantially rectangular outlet face 804 are not parallel to each other, individual openings in the inlet channels 812 (not shown) and outlet channels 814 can be parallel (or substantially parallel) to each other and represent surfaces of a generally cylindrical flow face surface. Referring to FIG. 9D, a side view of the layered filter media pack 900 of FIG. 9A is shown.

Figure 10A:
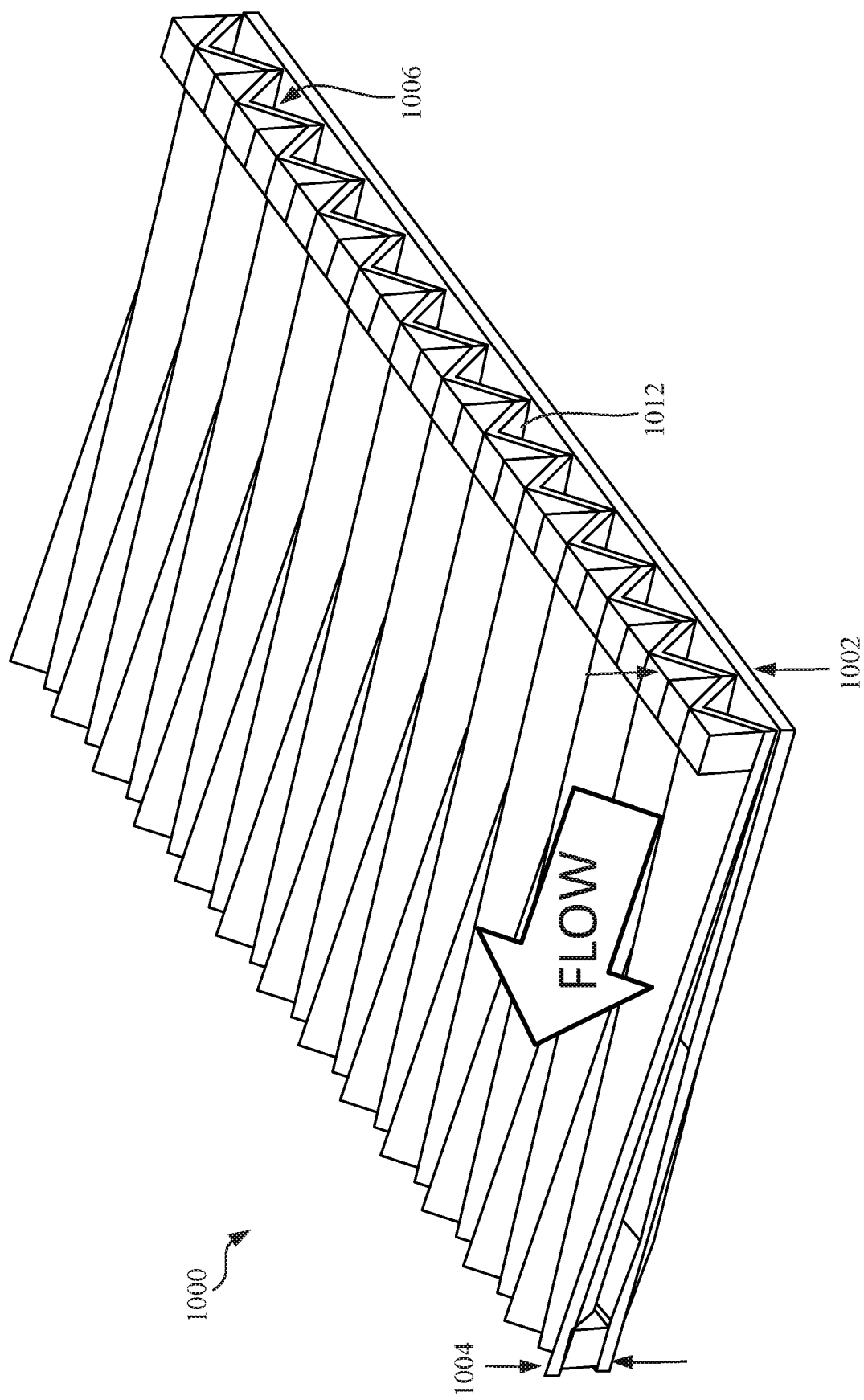
FIG. 10A shows a perspective view of a single layer pair of filter media sheets comprised of a tetrahedral filter media, according to an example embodiment.

Referring to FIG. 10A, a perspective view of a single layer pair of filter media sheets 1000 comprised of the filter media 1006 is shown, according to an example embodiment. The single layer pair of filter media sheets 1000 includes an inlet face 1002 and an outlet face 1004. The resulting single layer pair of filter media sheets 1000 has a larger inlet face 1002 than outlet face 1004. The height differential is formed by forming a deeper tetrahedral shape (or deeper corrugations in the media) toward the inlet edge of the filter media 1006 than toward the outlet edge of the filter media 1006. The filter media 1006 includes a plurality of inlet tetrahedron flow channels 1012 and a plurality of outlet tetrahedron flow channels 1014 (not shown), such as those described in U.S. Pat. No. 8,397,920, which is herein incorporated by reference in its entirety and for all purposes. As shown in FIG. 10A, the filter media 1006 includes a truncated tetrahedral shape on the outlet face 1004. The single layer pair of filter media sheets 1000 is cut at a substantially oblique angle to the flow surfaces. In some arrangements, the single layer pair of filter media sheets 1000 are substantially flat. In those arrangements, the flat layer may be embossed. In other arrangements, the single layer pair of filter media sheets 1000 are creased or curved to provide an improved flow at the lower edges between the pair of filter media sheets 1000.

Figure 10B:
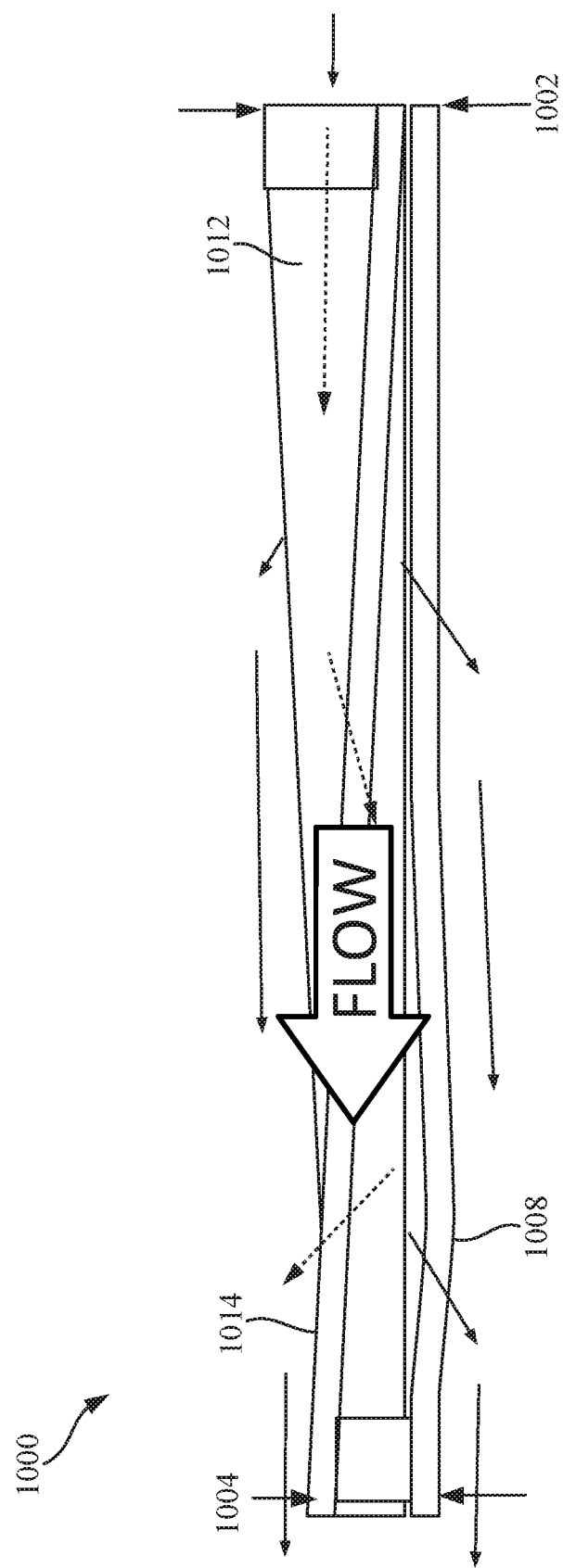
FIG. 10B shows a representation of the flow along a cross-section of the single layer pair of filter media sheets of FIG. 10A.

Referring to FIG. 10B, a representation of the flow along a cross-section of the single layer pair of filter media sheets 1000 of FIG. 10A is shown. Solid arrows represent the flow path through the tetrahedral folded sheet and dotted arrows indicate flow after passing through the sheet to the side tetrahedral channels (not shown). Air to be filtered flows into the inlet face 1002 and through the inlet tetrahedron flow channels 1012. The inlet tetrahedron flow channels 1012 merge in a central portion of the filter material, thereby allowing axial cross-flow of air between the inlet tetrahedron flow channels 1012 prior to the air passing through the filter media 1006. Such an arrangement provides for additional dust loading on the upstream side of the media, which increases filter capacity. The air then flows through the outlet tetrahedron flow channels 1014 and out of the outlet face 1004. The inlet tetrahedron flow channel height 1012 is greater than the outlet tetrahedron flow channel height 1014, which results in the inlet face 1002 having an inlet diameter that is larger than the outlet diameter of the outlet face 1004. As will be appreciated, the bent of the lower layer 1008 of the single layer pair of filter media sheets 1000 allows for less flow restriction between the edges of the single layer pair. In some arrangements, the flow may be in the opposite directions, such that air flows into the outlet face 1004 and out of the inlet face 1002. In some arrangements, the flow channels of the filter media 1006 are alternately sealed at the inlet face 1002 and the outlet face 1004.

Figure 10C:
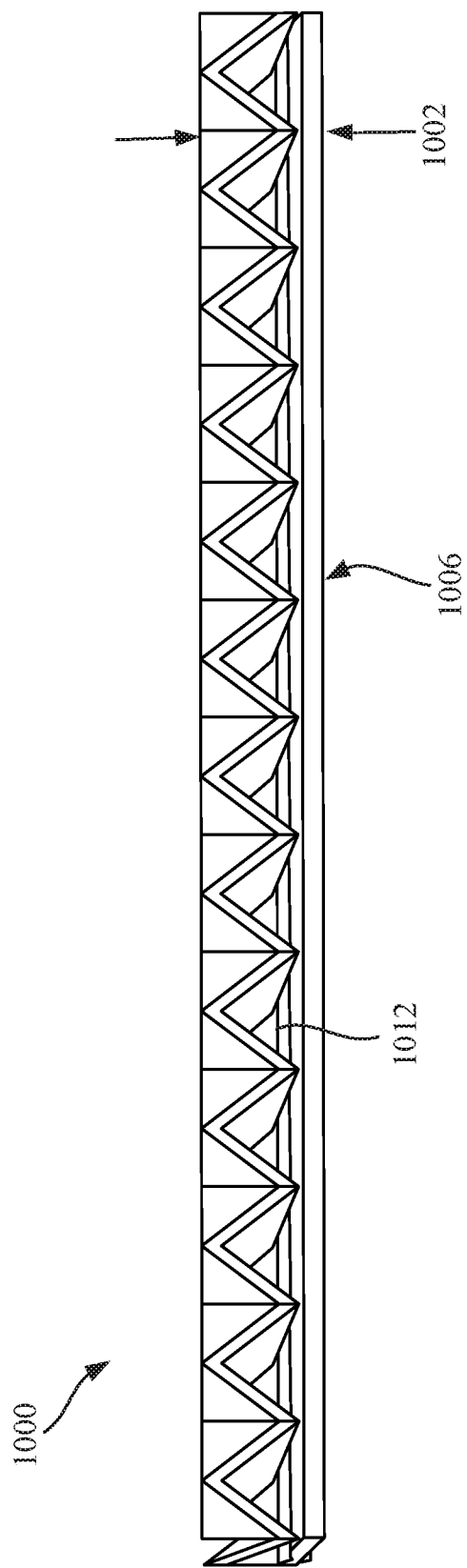
FIG. 10C shows a front view of an inlet face of the single layer pair of filter media sheets of FIG. 10A.
Figure 10D:
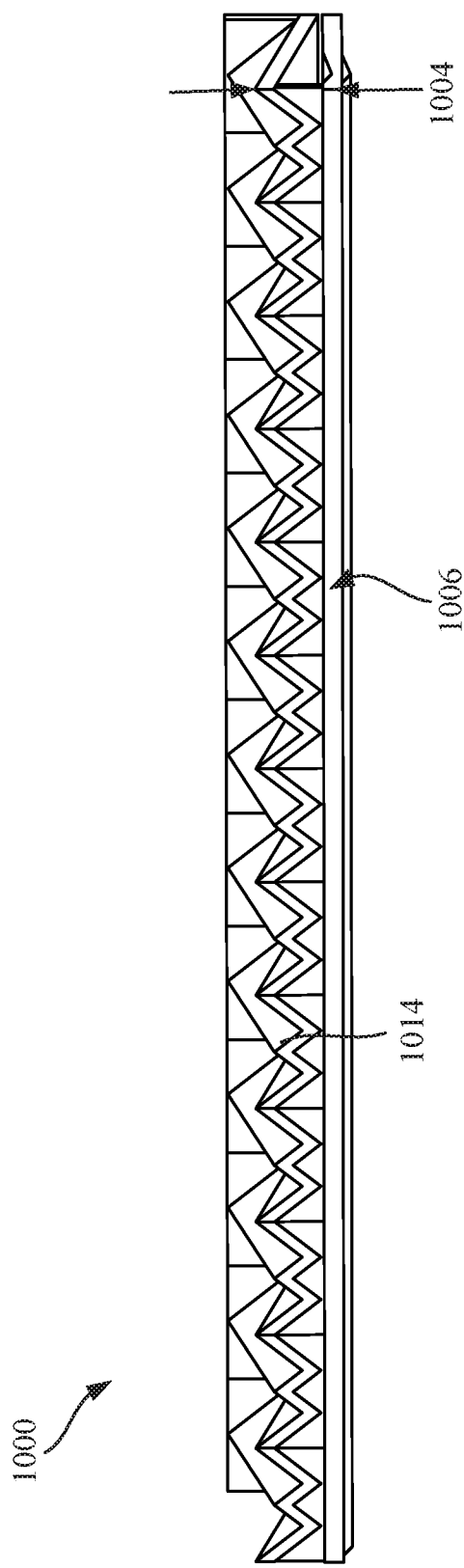
FIG. 10D shows a rear view of an outlet face of the single layer pair of filter media sheets of FIG. 10A.

Referring to FIG. 10C, a front view of an inlet face 1002 of the single layer pair of filter media sheets 1000 of FIG. 10A is shown. Referring to FIG. 10D, a rear view of an outlet face 1004 of the single layer pair of filter media sheets 1000 of FIG. 10A is shown. The filter media 1006 includes a truncated tetrahedral shape on the outlet face 1004 of the outlet tetrahedron flow channels 1014.

Figure 10E:
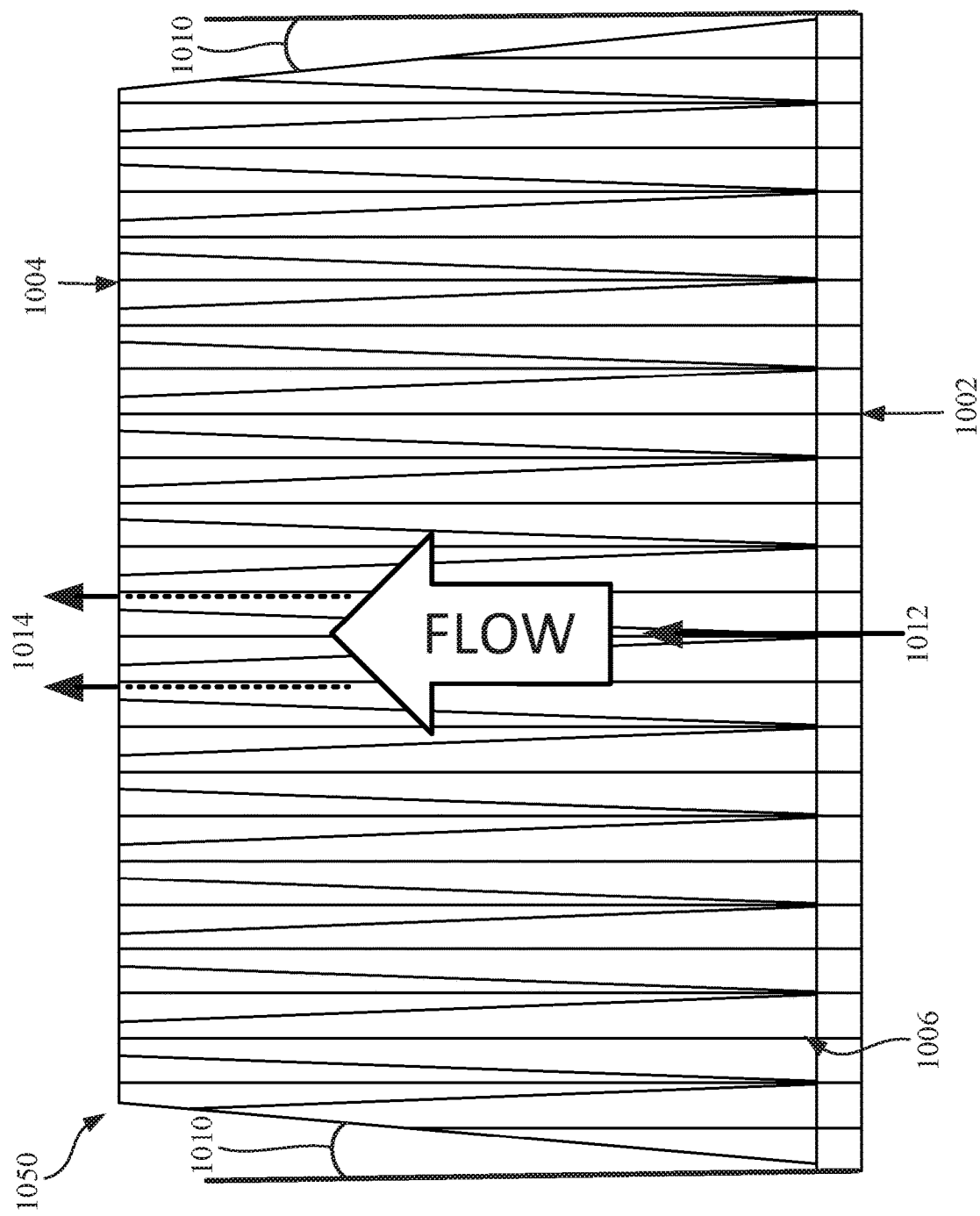
FIG. 10E shows a top view of a representation of a flow along a single layer pair of filter media sheets comprised of tetrahedral filter media, according to an example embodiment.

FIG. 10E shows a top view of a representation of a flow along a single layer pair of filter media sheets 1050. The single layer pair of filter media sheets 1050 is similar to the single layer pair of filter media sheets 1000. A difference between the single layer pair of filter media sheets 1050 and the single layer pair of filter media sheets 1000 is the single layer pair of filter media sheets 1050 is trimmed or tapered on both sides with respect to the inlet face 1002 and the outlet face 1004 at non-perpendicular angles. This tapering of the single layer pair of filter media sheets 1050 facilitates the conformance with a molded housing constructed with draft angles 1010 (only two sides shown in FIG. 10E) on all four sides. As will be appreciated, this enables fitting more filter media 1006 area into a housing and, therefore, a greater capacity for capturing contaminants. In some arrangements, the flow channels of the filter media 1006 are alternately sealed at the inlet face 1002 and the outlet face 1004.

As shown in FIG. 10E, the solid arrows represent the flow path through the tetrahedral folded sheet and dotted arrows indicate flow after passing through the sheet to the side tetrahedral channels (not shown). Air to be filtered flows into the inlet face 1002 and through the inlet tetrahedron flow channels 1012. The inlet tetrahedron flow channels 1012 merge in a central portion of the filter material, thereby allowing axial cross-flow of air between the inlet tetrahedron flow channels 1012 prior to the air passing through the filter media 1006. Such an arrangement provides for additional dust loading on the upstream side of the media, which increases filter capacity. The air then flows through the outlet tetrahedron flow channels 1014 and out of the outlet face 1004. The inlet tetrahedron flow channel height 1012 is greater than the outlet tetrahedron flow channel height 1014, which results in the inlet face 1002 having an inlet diameter that is larger than the outlet diameter of the outlet face 1004. In some arrangements, the flow may be reversed. In other arrangements, a rectangular tetrahedral may be used such that one of the folded edges of the single layer pair of filter media sheets 1050 is formed using a denser (e.g., smaller) fold pitch. In those arrangements, the bend of the single layer pair of filter media sheets 1050 is similar to the bend of an accordion. The resulting single layer pair of filter media sheets 1050 still has a larger inlet face 1002 than outlet face 1004 and has tapering on all sides.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   filter media having a plurality of asymmetrically formed tetrahedron flow channels, each of the plurality of asymmetrically formed tetrahedron flow channels comprising an inlet having an inlet height and an outlet having an outlet height, the inlet height larger than the outlet height, the filter media defining an inlet face having an inlet face area and an outlet face having an outlet face area, the inlet face is structured to receive air to be filtered, the outlet face is structured to output filtered air, the inlet face area being larger than the outlet face area.

2. The filter element of claim 1, further comprising a core, wherein the filter media is wound around the core.

3. The filter element of claim 1, wherein the filter media is layered to form a polyhedron shape.

4. The filter element of claim 1, further comprising a sidewall formed by the filter media, the sidewall angled with respect to the inlet face at a non-perpendicular angle.

5. The filter element of claim 1, wherein the plurality of asymmetrically formed tetrahedron flow channels are alternately sealed at the inlet and the outlet.

6. The filter element of claim 1, wherein the inlet is a substantially v-shaped inlet, the inlet height being the distance from a lower end of the v-shaped inlet to an upper end of the v-shaped inlet, along an axis that is substantially perpendicular to a longitudinal length of the filter media.

7. The filter element of claim 1, wherein the outlet is a substantially w-shaped outlet, the outlet height being the distance from a lower end of the w-shaped outlet to an upper end of the w-shaped inlet, along an axis that is substantially perpendicular to a longitudinal length of the filter media.

8. The filter element of claim 1, wherein the inlet face area is substantially rectangular and the outlet face area is substantially rectangular.

9. The filter element of claim 8, wherein the substantially rectangular inlet face area is substantially coaxial to the substantially rectangular outlet face area.

10. The filter element of claim 1, wherein the fitter media is a single layer pair with a truncated tetrahedral shape on the outlet face.

11. The filter element of claim 10, wherein the filter media is cut at a substantially oblique angle relative to the inlet face.

12. The filter element of claim 1, wherein the filter media is substantially flat.

13. The filter element of claim 1, wherein the inlet height being larger than the outlet height is formed by the tetrahedron flow channels comprising a deeper tetrahedron shape toward an edge of the inlet face than an edge of the outlet face.

14. A filter element comprising:
   filter media having a plurality of tetrahedron flow channels, each of the plurality of tetrahedron flow channels comprising an inlet having an inlet height and an outlet having an outlet height, the inlet height larger than the outlet height, the filter media defining an inlet face having an inlet face area and an outlet face having an outlet face area, the inlet face is structured to receive air to be filtered, the outlet face is structured to output filtered air, the inlet face area being larger than the outlet face area,
   wherein the inlet height being larger than the outlet height is formed by the tetrahedron flow channels comprising a deeper tetrahedron shape toward an edge of the inlet face than an edge of the outlet face.

15. A filtration system comprising:
   a housing body, the housing body comprising:
      a housing outlet, a housing inlet, and a housing side wall, the housing side wall being tapered with respect to the housing inlet face and the housing outlet at a non-perpendicular housing draft angle, wherein the housing draft angle of the housing side wall form a filter compartment; and
   a filter element installed in the filter compartment, the filter element comprising:
      filter media having a plurality of asymmetrically formed tetrahedron flow channels, each of the plurality of asymmetrically formed tetrahedron flow channels comprising an inlet having an inlet height and an outlet having an outlet height, the inlet height larger than the outlet height,
      the filter media defining an inlet face having an inlet face area and an outlet face having an outlet face area, the inlet face is structured to receive air to he filtered, the outlet face is structured to output filtered air, and the inlet face area being larger than the outlet face area.

16. The filtration system of claim 15, the filter element further comprising a filter element sidewall formed by the filter media, the filter element sidewall being tapered with respect to the inlet face and the outlet face at a non-perpendicular filter element draft angle, the filter element draft angle angled with respect to the inlet face at a non-perpendicular angle and substantially similar to the housing draft angle.

17. The filtration system of claim 15, wherein the filter media is a single layer pair with a truncated tetrahedral shape on the outlet face.

18. A filter element comprising:
   filter media having a plurality of flow channels, each of the plurality of flow channels comprising an inlet having an inlet height and an outlet having an outlet height, the inlet height larger than the outlet height, the filter media defining an inlet face having an inlet face area and an outlet face having an outlet face area, the inlet face is structured to receive air to he filtered, the outlet face is structured to output filtered air, the inlet face area being larger than the outlet face area,
wherein the inlet height being larger than the outlet height is formed by the flow channels comprising a deeper tetrahedron shape toward an edge of the inlet face than an edge of the outlet face.

* * * * *